United States Patent [19]

Okutomi et al.

[11] Patent Number: 4,833,721
[45] Date of Patent: May 23, 1989

[54] IMAGE PROCESSING APPARATUS

[75] Inventors: Masatoshi Okutomi, Yokohama; Tetsuo Sueda, Tokyo; Mitsuhiro Tokuhara, Chigasaki, all of Japan

[73] Assignee: Canon Kabushiki Kaisha, Tokyo, Japan

[21] Appl. No.: 157,147

[22] Filed: Feb. 11, 1988

Related U.S. Application Data

[63] Continuation of Ser. No. 727,226, Apr. 25, 1985, abandoned.

[30] Foreign Application Priority Data

| Apr. 27, 1984 | [JP] | Japan | 59-86596 |
| Sep. 14, 1984 | [JP] | Japan | 59-191770 |
| Sep. 14, 1984 | [JP] | Japan | 59-191771 |
| Dec. 28, 1984 | [JP] | Japan | 59-276461 |
| Dec. 28, 1984 | [JP] | Japan | 59-276462 |
| Dec. 28, 1984 | [JP] | Japan | 59-276464 |

[51] Int. Cl.⁴ .............................................. G06K 9/48
[52] U.S. Cl. ...................................... 382/21; 382/34
[58] Field of Search ................. 358/263; 382/21, 22, 382/34, 56

[56] References Cited

U.S. PATENT DOCUMENTS

| 3,863,218 | 1/1975 | Oka et al. ............................. 382/21 |
| 3,942,169 | 3/1976 | Fujimoto et al. ..................... 382/21 |
| 4,093,941 | 6/1978 | Bryan et al. ......................... 382/56 |
| 4,566,128 | 1/1986 | Araki .................................... 382/56 |

FOREIGN PATENT DOCUMENTS

2303841B2 8/1974 Fed. Rep. of Germany.
3326725A1 3/1984 Fed. Rep. of Germany.

OTHER PUBLICATIONS

Herbert Freeman, Computer Processing of Line-Drawing Images, Mar. 1974, ACM Journal.

Primary Examiner—Leo H. Boudreau
Attorney, Agent, or Firm—Fitzpatrick, Cella, Harper & Scinto

[57] ABSTRACT

An image processing apparatus comprises a detector which includes an image reading section of a digital copier and which chases outline information of an image pattern in a predetermined direction and thereby extracts outline points; an arithmetic operating circuit to respectively obtain outline tangential directions on the basis of the outline points; an extracting circuit to select a predetermined number of extraction points from the outline points; a coding circuit to sequentially obtain direction differences in the outline tangential directions on the basis of the extraction points and to code the direction differences; and a recognizing circuit to perform a non-linear matching between a code sequence coded by the coding circuit and a reference code sequence, thereby recognizing the image pattern. The coding circuit calculates the outline tangential directions using predetermined direction codes. With this apparatus, an image pattern can be stably and accurately recognized at high speed without being influenced by positional deviation, rotation, change in size, or the like of the image pattern.

11 Claims, 22 Drawing Sheets

| $|i-j|$ | 0 | 1 | 2 | MORE THAN 2 |
|---|---|---|---|---|
| $f(|i-j|)$ | 0 | 0.1 | 0.5 | $\infty$ |

REFERENCE CODE  1  1  1  1  0  0  -3  0  4  0 ------ a  b  c d  e  f  g  h  i  j  k

INPUT CODE  1  1  1  0  0  -3  0  1  3  0 -----

| a | b | c | d | e | f | g | h | i | j | k |
|---|---|---|---|---|---|---|---|---|---|---|
| 0 | 0 | 0 | 0.1 | 0.1 | 0.1 | 0.1 | 0.1 | 1 | 1 | 0 |

1, 0, 1, 0, 0, 0, 1, 1, 0, 4, 0, -2, -1, -1, 0, 0, -1, -2, 0, 3

1, 1, 1, −1, 0, 1, 1, 1, 1, 3, 0, −1, −1, −1, 2, −1, −1, −1, 3, 1

REFERENCE CODE FOR "2" 1,1,1,0,0,-3,0,0,4,0,0,3,0,0,-1,-1,-1,-1,4,1
REFERENCE CODE FOR "3" 1,1,1,-2,1,1,1,1,1,4,-1,-1,-1,-1,2,-1,-1,-1,4,1

| | CATEGORY 1 | | CATEGORY 2 | | |
|---|---|---|---|---|---|
| | MIN | MAX | MIN | MAX | |
| $P_0$ | 1 | 1 | 0 | 0 | |
| $P_1$ | 0 | 2 | × | × | |
| $P_2$ | 0 | 2 | × | 3 | |
| $P_3$ | × | × | 2 | 4 | |
| ⋮ | ⋮ | ⋮ | ⋮ | ⋮ | |
| $P_{14}$ | -1 | 0 | × | -2 | |

IMAGE PROCESSING APPARATUS

This application is a continuation of application Ser. No. 727,226 filed 4/25/85, now abandoned.

BACKGROUND OF THE INVENTION

1. Field of the Invention

The present invention relates to an image processing apparatus which can recognize hand written characters, print characters and other any patterns and, more particularly, to such an image processing apparatus which can be used as a man-machine interface of an electronic apparatus such as a computer, typewriter, word processor, etc.

2. Description of the Prior Art

Hitherto, a variety of propositions have been made with respect to pattern recognition. For example, in case of using outline information as a characteristic point, there are advantages such that the number of data to be processed is smaller and the processing speed is faster than those in the method whereby a correlation of the two dimensional data in the pattern region is obtained; and a noise which is caused upon what is called a fine patterning process is not generated as compared with the method whereby the pattern frame is derived by way of the fine patterning process and is used as a characteristic point. Actually speaking, for instance, in case of recognizing a pattern using outline information of the pattern, the outline direction in each outline point is obtained as a digitized code in accordance with the direction codes of 1 to 8 shown in FIG. 1.

However, according to this method, for example, if there is a pattern as shown in FIG. 2, the direction code that is derived when the outline is traced clockwise from a start point $S_1$ in the diagram becomes as shown in FIG. 3 and the direction code which inherently continuously changes becomes discontinuous on the code as shown in the portions indicated at A and B in FIG. 3 (corresponding to a and b in FIG. 2), causing inconvenience upon recognition.

This means that a change in start point due to the case where the original pattern is rotated or the like makes the subsequent recognition difficult and there is a drawback such that the processing time becomes long.

Therefore, it is the main stream that the interface between the apparatus and human being is performed by means of conventional keys contrary to realization of high performance of electronic apparatuses and the unnecessary work of man in this portion is still considerable. Further, such man-machine interface requires skill, so that there is demanded an image processing apparatus which performs the function of the man-machine interface which can edit and process hand written characters or images and can output predetermined figures, printing types or the like.

SUMMARY OF THE INVENTION

It is an object of the present invention to eliminate the above-mentioned drawbacks in consideration of the foregoing point.

Another object of the invention is to provide an interface between an apparatus and human being.

Still another object of the invention is to provide an image processing apparatus which constitutes a man-machine interface.

Still another object of the invention is to provide an image processing apparatus to reduce the work of people who handle an apparatus and thereby to realize the work of high efficiency.

Still another object of the invention is to provide an image processing apparatus in which an outline of a pattern is perceived as successive data and a stable pattern that is not affected by deviation in position of the pattern, rotation, change in size, or the like can be recognized.

Still another object of the invention is to provide an image processing apparatus in which the above-mentioned drawbacks in the conventional example are eliminated while maintaining an advantage such that the outline information of a pattern is used as a characteristic, and an amount of data of the dictionary pattern is made small, thereby to realize a high recognizing speed.

Still another object of the invention is to provide an image processing apparatus comprising:

storage means for storing an image pattern;

pre-processing means for performing digitization, binarization or the like of the pattern;

characteristic extracting means for extracting a characteristic pattern on the basis of the data derived by the pre-processing means;

matching means for matching the data extracted by the characteristic extracting means with dictionary data;

these means being connected like a pipeline; and control means for controlling those means.

Still another object of the invention is to provide an image processing apparatus comprising:

extracting means for selecting a predetermined number of outline points from among a plurality of outline points of an image pattern;

means for sequentially obtaining direction differences in the tangential directions of the outline on the basis of the extraction points and coding these direction differences; and means for regarding the code sequence coded by the coding means and the reference code sequence corresponding to the image pattern as multidimensional vectors and normalizing them and thereby recognizing the image pattern.

Still another object of the invention is to provide an image processing apparatus comprising:

detecting means for tracing outline information of an image pattern in predetermined directions and detecting outline points;

extracting means for selecting a predetermined number of outline points from among the outline points detected by the detecting means;

means for sequentially obtaining direction differences in the tangential directions of the outline on the basis of the extraction points and coding these direction differences; and recognizing means for non-linearly matching the code sequence coded by the coding means with the reference code sequence and thereby recognizing the image pattern.

Still another object of the invention is to provide an image processing apparatus comprising:

detecting means for tracing outline information of an image pattern in predetermined directions and detecting outline points;

arithmetic operating means for respectively obtaining the tangential directions of the outline on the basis of a plurality of outline points detected by the detecting means; and means for sequentially obtaining direction differences in the tangential directions of the outline and coding these direction differences.

BRIEF DESCRIPTION OF THE DRAWINGS

FIG. 5-1 is a block diagram of a processing section;

FIG. 5-2 is a diagram showing the flow of extraction of characteristics of a pattern;

FIG. 19-1 is a diagram showing one example of the input pattern;

FIG. 19-2 is a diagram showing an example of the coding of the input pattern shown in FIG. 19-1;

FIG. 19-3 is a diagram showing one example of the coding in case where the start point of the coding shown in FIG. 19-2 is deviated;

FIGS. 29(A) and 29(C) are diagrams showing periodic numeric values to calculate characteristic points;

DETAILED DESCRIPTION OF THE PREFERRED EMBODIMENTS

The present invention will now be described in detail hereinbelow with reference to the drawings. An image which is used in this specification denotes a character, mark, symbol, picture, or the like.

Figure 4A:
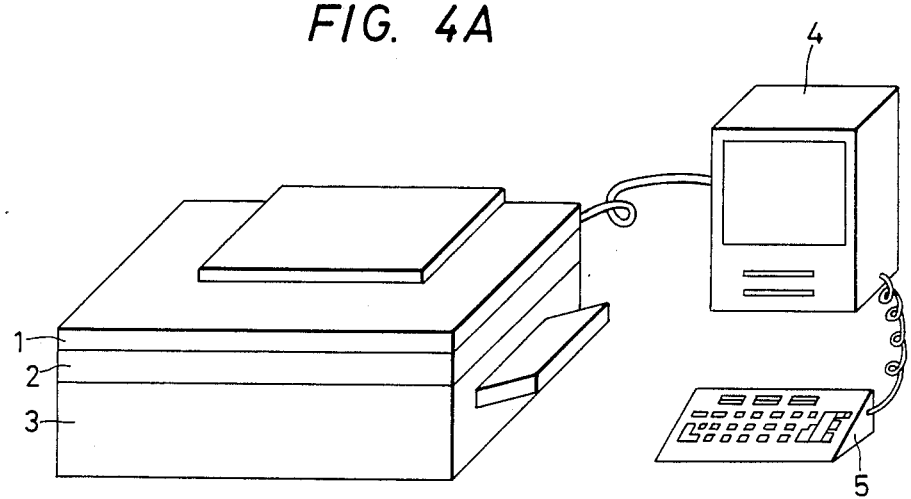
FIGS. 4(A) and 4(B) are diagrams showing one example of an image processing apparatus to which the present invention can be applied.
Figure 4B:
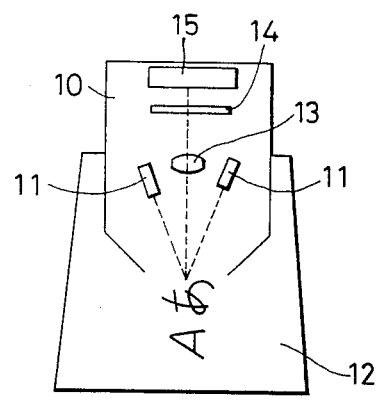

FIGS. 4(A) and 4(B) are diagrams showing one example of an image processing apparatus to which the present invention can be applied. A reference numeral 1 denotes a reader; 2 is a control section of an OCR, reader, printer, or the like; 3 a printer; 4 a computer which is equipped with a display, and this computer can output control commands to respective apparatuses and enables desired data to be displayed; and 5 a keyboard. In FIG. 4(B), a numeral 10 indicates a main body of a handy type image processing apparatus; 11 is a light source; 12 an original to be read; 13 an optical system to direct the light from the light source 11 from a pattern on the original 12 to a photo-electric converting device (for example, a plane CCD) 14; and 15 a processing section to perform the processing and/or outputting of output data from the photo-electric converting device 14. The apparatus is not limited to such a structure. In addition, the apparatus may be one of the systems equipped with a disc device, microfilm work station and the like.

[Extraction of characteristics]

Figure 1:
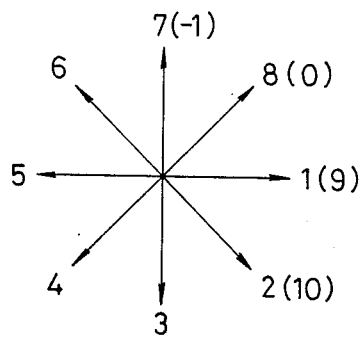
FIG. 1 is a diagram showing conventional direction codes.
Figures 1, 5:
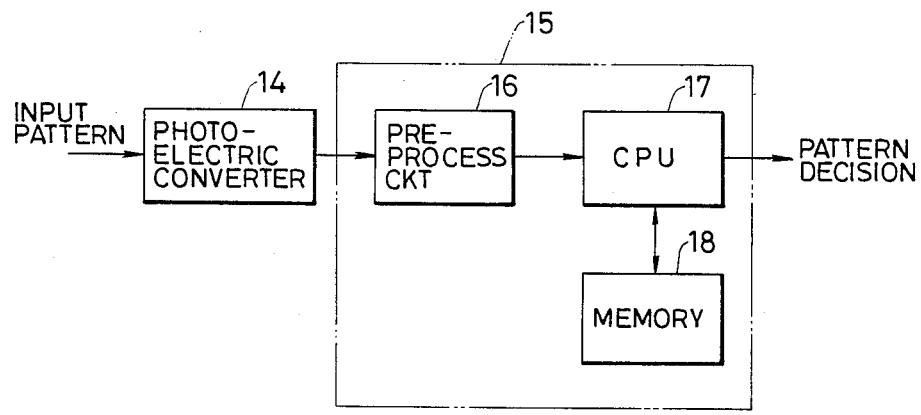
Figures 2, 5:
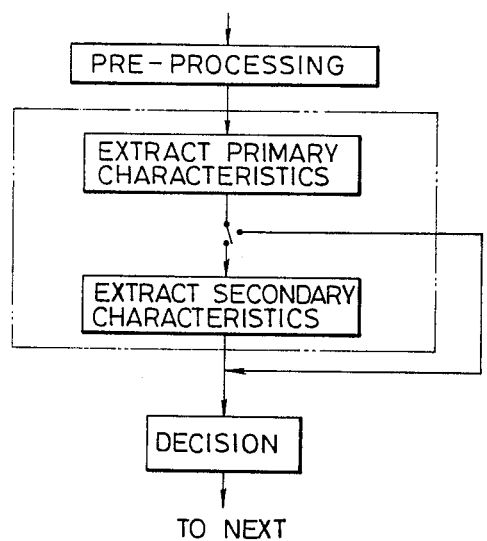

The processing section 15 will now be explained in detail. FIG. 5-1 is a block diagram of the processing section 15. A pre-processing circuit 16 performs binarization, elimination of the noise, etc. for the input pattern. Next, characteristics of the pattern are extracted by a CPU 17 and a memory 18. The characteristic extraction is executed in accordance with a flow shown within a broken line in FIG. 5-2. Namely, the outline information of the pattern is coded by performing primary characteristic extraction. This code is used as it is in dependence upon the pattern or extraction method. Further, other characteristics different from the above-mentioned code sequence may be extracted by means of secondary characteristic extraction. The characteristics thus derived are collated with a dictionary such as the memory 18 or the like, or their similarities or correlations are calculated and thereby the pattern may be decided. Moreover, the foregoing characteristic extraction may be repeated or other characteristics may be extracted and thereafter the pattern may be determined. The image reading section for extraction of outline points of a pattern which will be mentioned later is a read sensor (CCD) of the reader 1 (digital copier).

Next, the characteristic extraction of the invention will be described further in detail. In the primary characteristic extraction, only a predetermined constant number of pixels are first extracted from among the pixels forming the outline of the pattern. Next, direction differences in the tangential directions of the outline are obtained on the basis of those extraction points and they are sequentially coded.

[Extraction of outline points]

Figure 6:
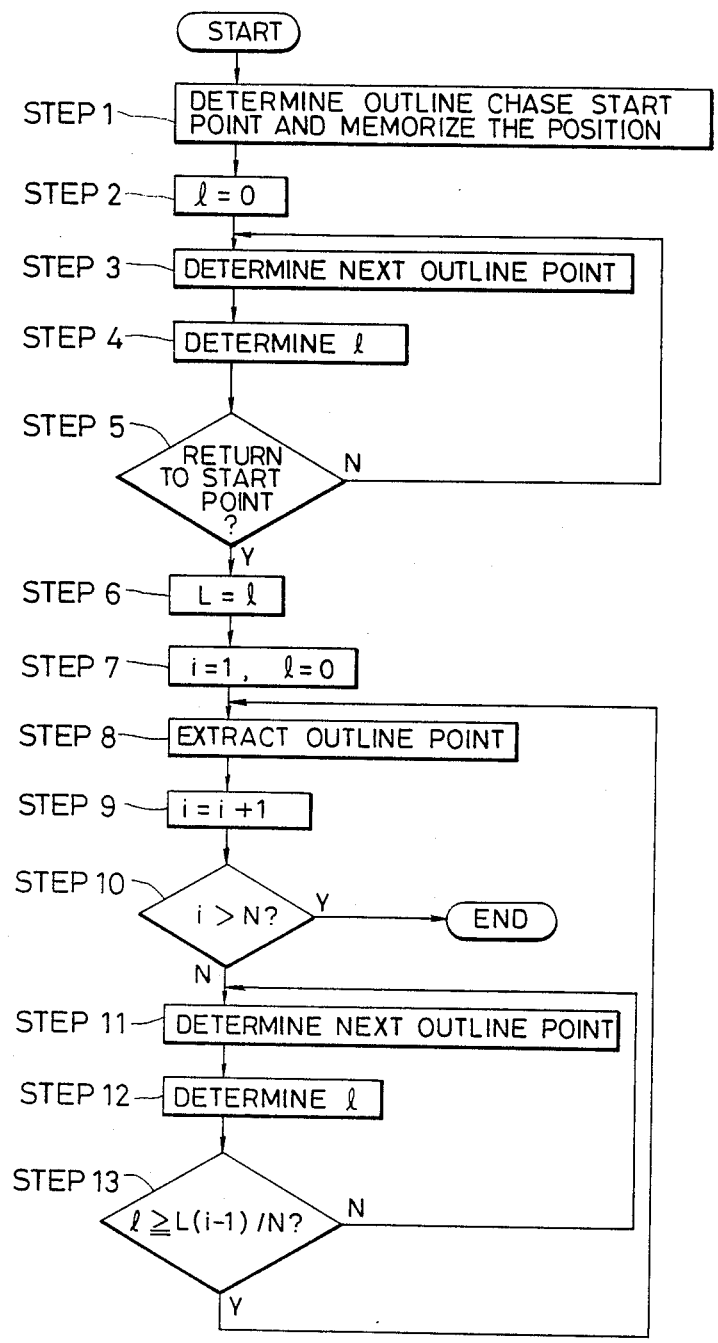
FIG. 6 is a diagram showing a method for extracting outline points in a primary characteristic extracting section.

FIG. 6 shows a flowchart for extraction of the outline points.

Practically speaking, the outline chase start point is first determined by a method whereby an image is raster scanned and the pixel of the pattern on which the scanning is performed for the first time is obtained or by another method and then the position of this start point is stored (STEP 1). Then, the next outline point on the outline, for instance, on the right side is determined (STEP 3) and a distance l from the start point is determined (STEP 4). The distance l from the start point is derived by performing the calculations, for instance, according to the following equations (1) and (1').

For example, when the next outline point is located at the upper, lower, right, or left position, $$l = l + 1 \tag{1}$$

If the next outline point is located at a position in the oblique direction, $$l = l + 1.4 \tag{1'}$$

Due to the above calculations, a length L of one circumference of the outline is determined by the processes until STEP 6.

Then, a constant number N of outline points are extracted on the basis of the value of L. First, the start point is selected as an extraction point (STEP 8). The next outline point and the outline length l from its start point are determined (STEPs 1 and 12). A value of l is calculated in accordance with equations (1) and (1'). Then, the following condition is checked to derive the outline point for every distance L/N (STEP 13).

$$l \geq \frac{L(i-1)}{N} \tag{2}$$

N is a predetermined number of outline points to be extracted. If expression (2) is satisfied, the processing routine is returned to STEP 8 and the outline point is extracted. In the case where expression (2) is not satisfied, namely, if the operation does not reach the next outline point, STEPs 11 and 12 are repeated. After completion of extraction of N outline points, the processing routine is finished (STEP 10).

Figure 7:
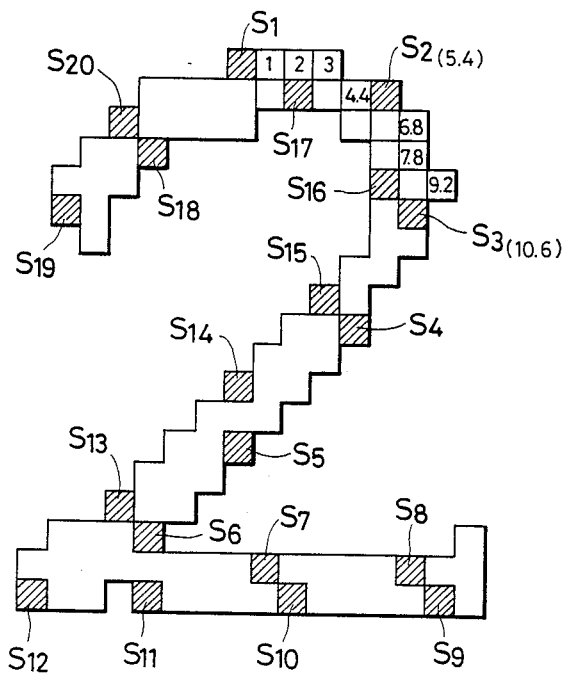
FIG. 7 is a diagram showing one example of a pattern and its outline extraction points.

If the above-described method is applied to, e.g., a pattern shown in FIG. 7, the pixels ($S_1$ to $S_{20}$) shown by the hatched portions in the diagram are extracted. The distance between the respective outline points is L/N. In this example, N is set to 20 and the outline chase start point is $S_1$ and the outline was chased clockwise.

Practically speaking, in the pattern shown in FIG. 7, when the whole length L of the pattern is 98.6, L/N becomes 4.93 because N=20. The distance l is calculated by assuming that the side of one pixel is 1 and the diagonal line is 1.4 in a manner as described with regard to equations (1) and (1') in STEP 4 in FIG. 6. Each numeric value shown in the pixels in FIG. 7 represents the distance. Namely, if the scan advances from the pixel $S_1$ to the pixel $S_2$ (indicated by the hatched portions), the distance becomes 5.4. Since 5.4>4.93 in STEP 13, the pixel shown by the hatched portion is extracted as an extraction point $S_2$. Similarly, as shown in FIG. 7, the distance advances to 6.8, 7.8 and 9.2 until the next extraction point and l becomes 10.6 in the next hatched portion. In step 13 in FIG. 6, since 10.6>4.93×2, this pixel is extracted as the extraction point ($S_3$). In a similar manner as above, the extraction points $S_1$ to $S_{20}$ shown in FIG. 7 are extracted.

Figure 8:
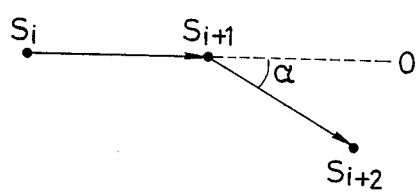
FIG. 8 is a diagram showing the relation between the outline extraction points and the direction difference in the tangential direction of the outline.
Figure 9:
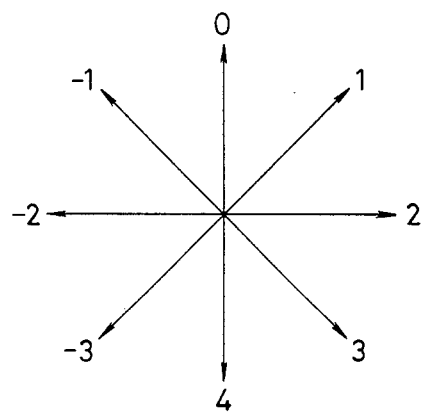
FIG. 9 is a diagram showing direction codes in each outline extraction point in the case where the invention is applied.
Figure 10:
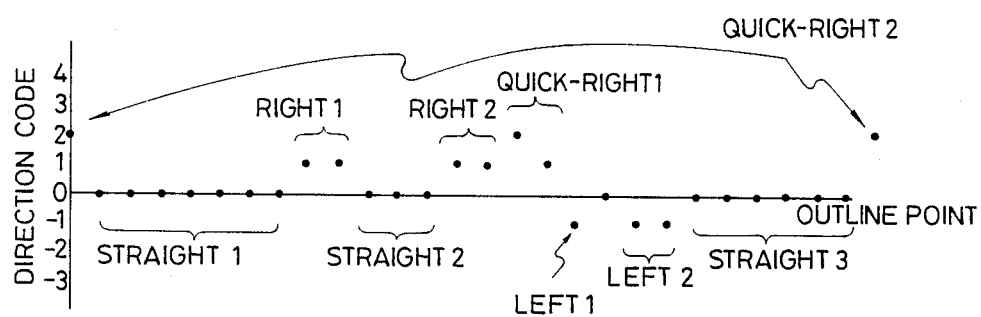
FIG. 10 is a diagram showing the relation between the outline points and the direction codes.

Then, the direction differences in the tangential directions of the outline are sequentially obtained on the basis of the outline extraction points and are coded. For example, when the outline extraction points are arranged as shown in FIG. 8, the direction difference in the outline tangential direction is α in the diagram and then it is digitized, e.g., in eight directions as shown in FIG. 9 and is coded. The first outline tangential direction ($\overrightarrow{S_iS_{i+1}}$ in FIG. 8) is always made coincide with the direction of code 0. By coding the direction difference in the outline tangential direction in this way, it is possible to obtain the code sequence which periodically changes even if the outline is chased many times without causing an improper discontinuous point. As an example, FIG. 10 shows a code sequence that is derived using all outline points of the pattern in FIG. 2. As will be obvious in comparison with FIG. 3, the code sequence does not have an improper discontinuous point and is suitable for the subsequent discriminating process and also it is stable for a variation in start point of the code. In addition, since the code sequence can be processed as a periodic function, by performing, e.g., a discrete Fourier transformation to this function, the code sequence can be also discriminated on the frequency axis.

Figures 11, 12, 13:
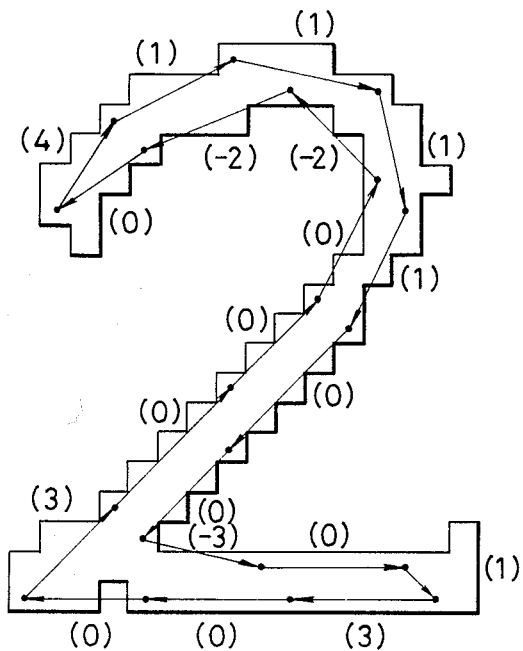
FIG. 11 is a diagram showing direction codes according to the present invention.
FIG. 12 is a diagram showing one example of a dictionary for every category which is used in a discriminating section.
FIG. 13 is a diagram showing an example of correspondence of the codes.

FIG. 11 shows the result of the pattern shown in FIG. 7 to which the process explained in detail in the above was performed. Each numeric value indicated by ( ) in the diagram denotes the code sequence. The outline shape is well expressed without being influenced by fine concave and convex portions of the pattern and its lengths are normalized.

As described above, the difference between the outline direction at each outline point and the outline direction at a previous outline point when an outline of a pattern is chased in a certain direction is calculated and is coded according to the present invention, thereby enabling the characteristics of the outline of the pattern to be stably expressed and also the continuous and periodic direction code sequence can be easily obtained.

Distance

Next, the non-linear matching between the code sequence derived by way of the characteristic extraction and the reference code sequence which has been preliminarily stored in the memory is first performed in the discriminating section. Then, the distance D indicative of similarity between the input pattern and the category to which the reference code sequence belongs (a value of the distance D becomes small as the similarity is large) is calculated. Expressions for calculating D expressions are shown below.

Assuming that the code sequence of a certain input pattern is $$a_1, a_2, \ldots, a_N$$

and the reference code sequence is $$c_1, c_2, \ldots, c_N$$

the following recurrence formulae are calculated.

$$\begin{cases} g(1, 1) = d(c_1, a_1) \\ g(i, j) = d(c_i, a_j) + \min[g(i-1, j), \\ \qquad\qquad g(i, j-1), g(i-1, j-1)] \end{cases} \quad (3)$$

where, $$d(c_i, a_j) = |c_i - a_j| + f(|c_i - a_j|) \quad (4)$$

In these formulae, $d(c_i, a_j)$ is a distance between the reference code $c_i$ and the input code $a_j$ and $f(|c_1 - a_j|)$ corresponds to the penalty for the deviation of the position on the code sequence of the corresponding code and, for example, it is determined as shown in FIG. 12.

The distance D between the input pattern and the category is finally derived by the following equation $$D = g(N, N) \quad (5)$$

Figures 14, 15:
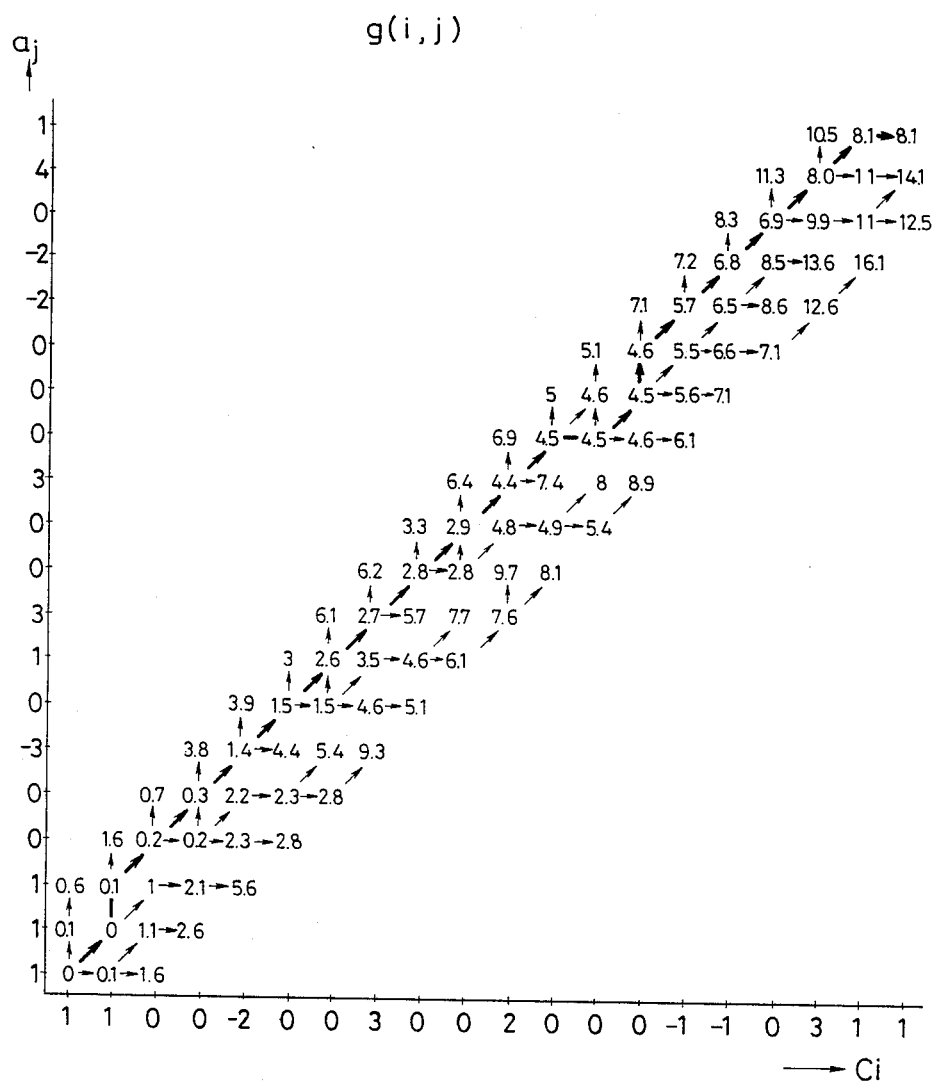
FIG. 14 is a diagram showing distances among the codes responsive to the correspondence in FIG. 13.
FIG. 15 is an explanatory diagram of a method for calculating the distance D between the code sequence of the input pattern shown in FIG. 11 and the code sequence of the reference pattern of character "2"

For instance, if the input code due to the input pattern shown in FIG. 11 and a certain reference code are made to correspond as shown in FIG. 13 (this correspondence is obtained by calculating formulae (3) and (4) until the final stage), the distances $d(c_i, a_j)$ among the respective codes at that time are as shown in FIG. 14 and the sum of them is equal to D.

Next, the calculation of D and matching will be described in detail with reference to the drawings. As shown in FIG. 11, the code sequence of the input pattern is obviously as follows.

$$a_j = 1, 1, 1, 0, 0, -3, 0, 1, 3, 0, 0, 3, 0, 0, 0, -2, -2, 0, 4, 1.$$

Assuming that another code sequence of the reference pattern of character "2" is $$c_i = 1, 1, 0, 0, -2, 0, 0, 3, 0, 0, 2, 0, 0, 0, -1, -1, 0, 3, 1, 1,$$

the method for calculating D is based on a flow shown in FIG. 15. Namely, in formula (3), $g(1,1) = d(c_1, a_1)$ becomes $g(1,1) = 0$ since $c_1 = 1$ and $a_1 = 1$.

$g(1,2) = d(c_1, a_2)$ becomes $g(1,2) = d(c_1, a_2) +$ $\min[g(1,1)] = 0.1$ since $c_1 = 1$ and $a_2 = 2$.

Similarly, $g(2,2) = d(c_2, a_2) + \min[g(1,2), g(2,1),$

-continued $g(1,1)] = |c_2 - a_2| + f(|c_2 - a_2|) +$ $\min(0.1, 0.1, 0) = 0$

Where, $f(|C_i - a_j|)$ is a datum based on the correspondence between i and j (corresponding sampling points) shown in FIG. 12. By performing the calculations hereinafter until i and j become 1 to 20, the value (D=8.1) of g(i,j) when i=j=20 is calculated as shown in the right top portion in FIG. 15.

Figure 16:
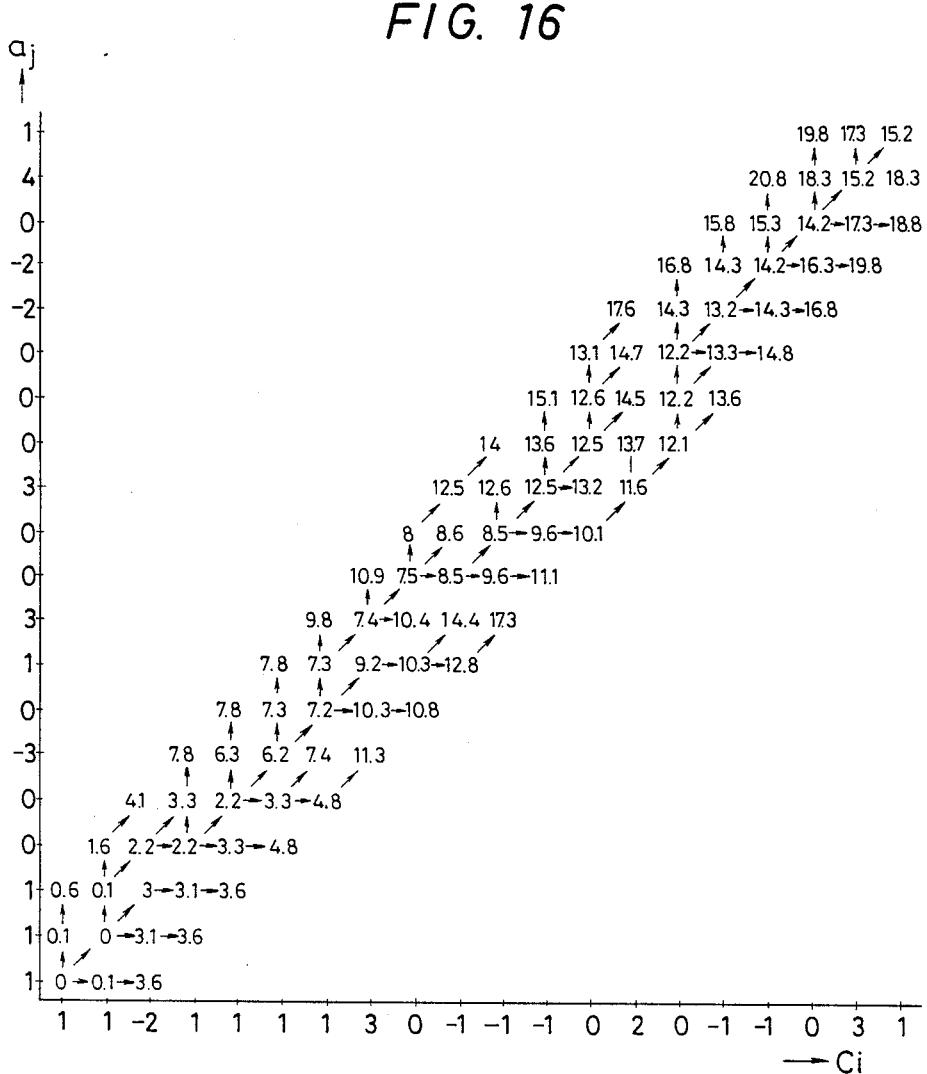
FIG. 16 is an explanatory diagram of a method for calculating the distance D between the code sequence of the input pattern shown in FIG. 11 and the code sequence of the reference pattern of character "3"

On the other hand, in the case where the reference pattern is replaced by the reference pattern $$(c_i = 1, 1, -2, 1, 1, 1, 3, 0, -1, -1, -1, 0, 2, 0, -1, -1, 0, 3, -1)$$

of "3" t with regard to the same pattern show in in FIG. 7, the result shown in FIG. 16 is derived. Namely, in case of using the reference pattern of "3", D=15.2 is calculated as a value of g(i,j) when i=j=20.

As will be apparently understood from the above explanation, with respect to the pattern shown in FIG. 7, it is possible to determine that the distance in case of the reference pattern "2" is shorter than that in case of the reference pattern "3" because the respective D values are related as 8.1 < 15.2; consequently, a probability such that the pattern shown in FIG. 7 is determined to be "2" becomes high.

Figure 17:
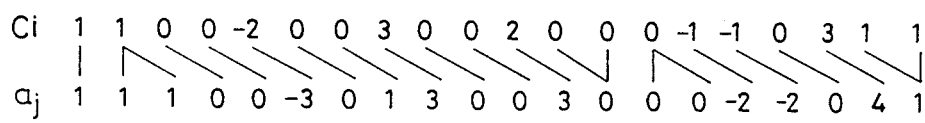
FIG. 17 is a diagram showing the correspondence between the reference pattern 2 and the input

The correspondence between each extraction point of the reference pattern "2" and each extraction point of the pattern shown in FIG. 7 is as shown by a fat arrow in FIG. 15. Eventually, the correspondence as shown in FIG. 17 is derived. It will be apparently understood from the diagram that the unnatural correspondence is not performed in each position.

On one hand, it is also possible to change the selecting condition of the extraction points shown in FIG. 6 as necessary and to extract the deviated extraction points as many as a plurality of times and thereby further improving the accuracy.

Figure 18:
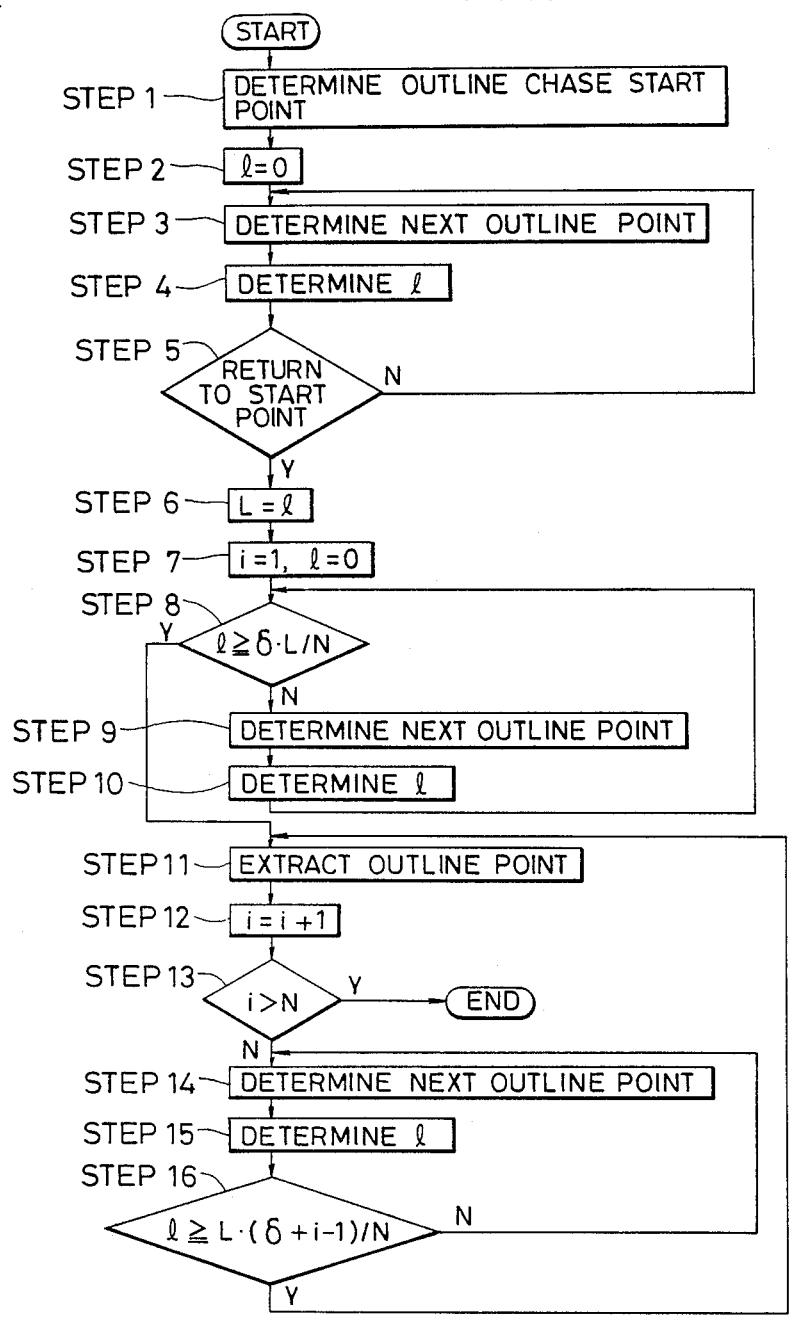
FIG. 18 is a flowchart in case of deviating and selecting the extraction points.

Next, there will be explained hereinbelow a method whereby with respect to character pattern "3", the foregoing extraction points are deviated and various distances D (formula (5)) are calculated and the high accurate recognition can be performed. The method for extracting outline points in this case is shown in FIG. 18. Its detailed explanation is omitted since it is similar to FIG. 6. In FIG. 18, $\delta$ shown in STEPs 8 and 16 denotes an offset amount (value to indicate how far the outline extraction point is deviated from the first outline extraction point) from the first outline extraction point and it has a value within a range of $$0 \leq \delta < 1$$

(If $\delta = 0$, the extraction point coincides with the first outline extraction point).

Figure 2:
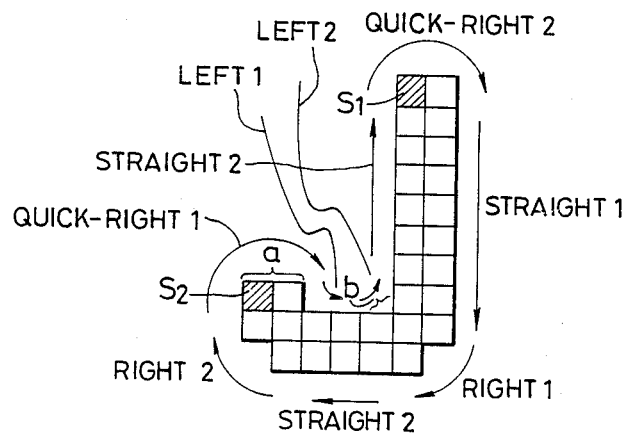
FIG. 2 is a diagram showing one example of a pattern.
Figures 1, 19:
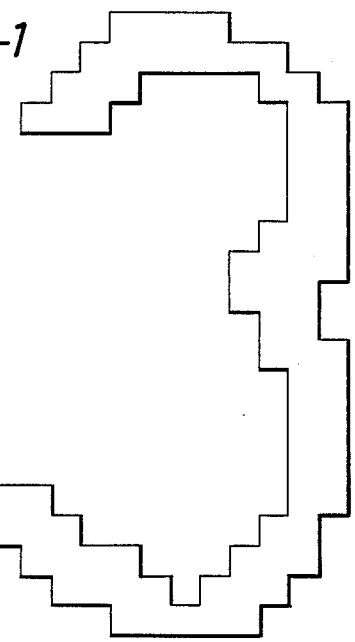
Figures 2, 19:
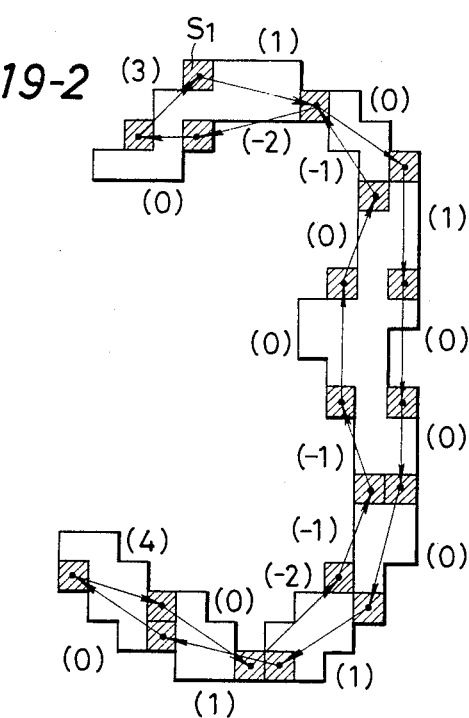
Figures 3, 19:
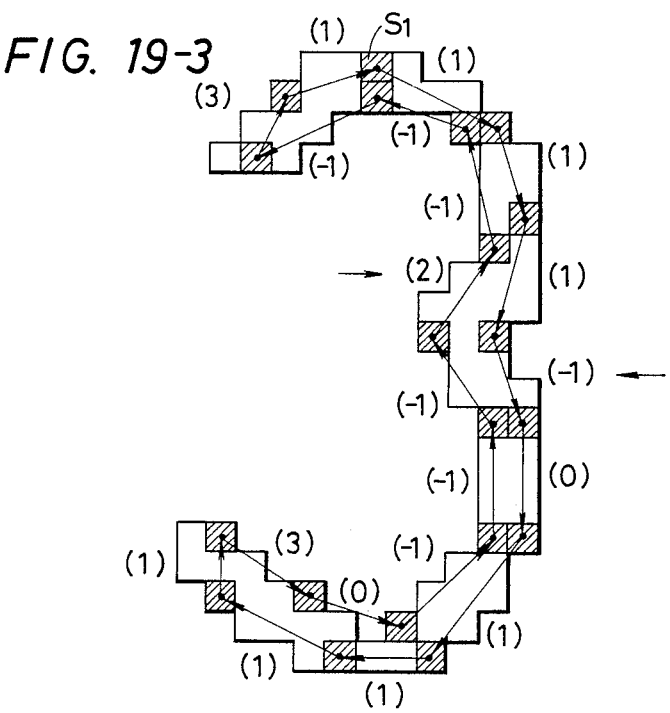

For instance, when there is an input pattern as shown in FIG. 19-1, the first outline extraction point and the direction codes which are further obtained therefrom are as shown in FIG. 19-2.

Figure 3:
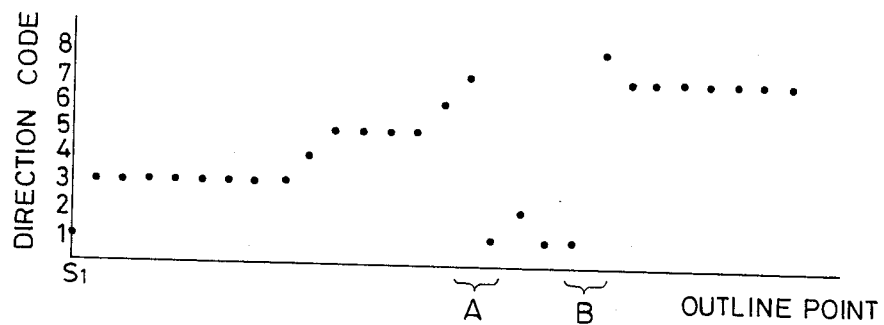
FIG. 3 is a diagram showing the relation between the outline points and the direction codes.

On the other hand, when $\delta = \frac{1}{2}$ and the outline extraction is again performed and the code sequence is derived, it is as shown in FIG. 19-3. In other words, the position of the first extraction point is deviated by only $\frac{1}{2} L/N$.

It will be appreciated from comparison with FIG. 19-2, the concave and convex portions of the outline shape of the pattern are accurately reflected to the codes (portions indicated by "→" in FIG. 19-3); therefore, a probability such that the pattern is correctly recognized due to the subsequent processes remarkably increases. For example, if the number of blocks of the minus codes which overlap on the code (corresponding to the number of concave portions of the pattern) is used for rough classification, although only two blocks are detected in FIG. 19-2, three blocks are accurately detected in compliance with the pattern shape in FIG. 19-3, so that a possibility such that the correct recognition is performed becomes fairly high (refer to fat arrows "↑" on the code sequences in FIGS. 19-2 and 19-3). The value of δ is not limited to ½. For example, the outline extraction may be repeated while varying the value of δ little by little such as 1/5, 2/5, 3/5, and 4/5. With this method, the more accurate recognition can be performed.

The result of discrimination by way of the above-mentioned series of processes may be directly outputted as a recognition result, or it may be stored as a standby category and the processing routine may also advance to further another recognizing process.

Figure 22A:
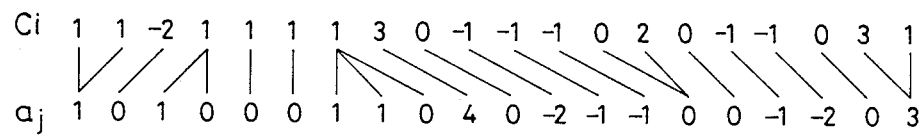
FIGS. 22(A) and 22(B) are diagrams showing the correspondence of each pattern shown in FIGS. 20 and 21, respectively.
Figure 22B:
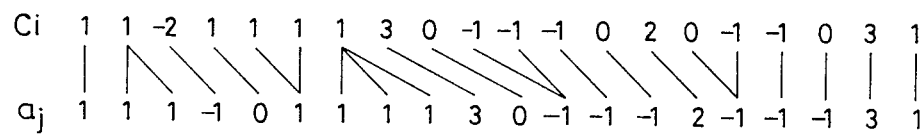
Figure 20:
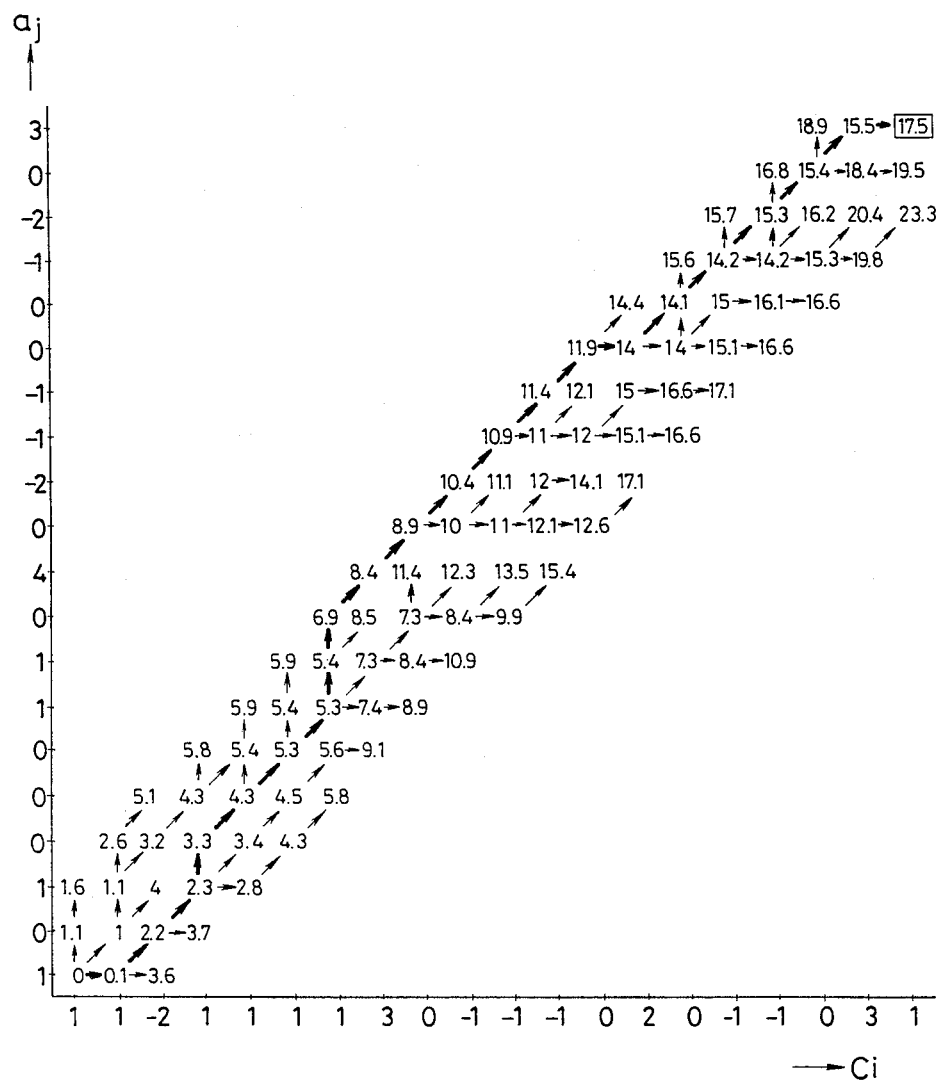
FIG. 20 is a diagram showing a method for calculating the distance D between the code sequence shown in FIG. 19-2 and the code sequence of the reference pattern of character "3"
Figure 21:
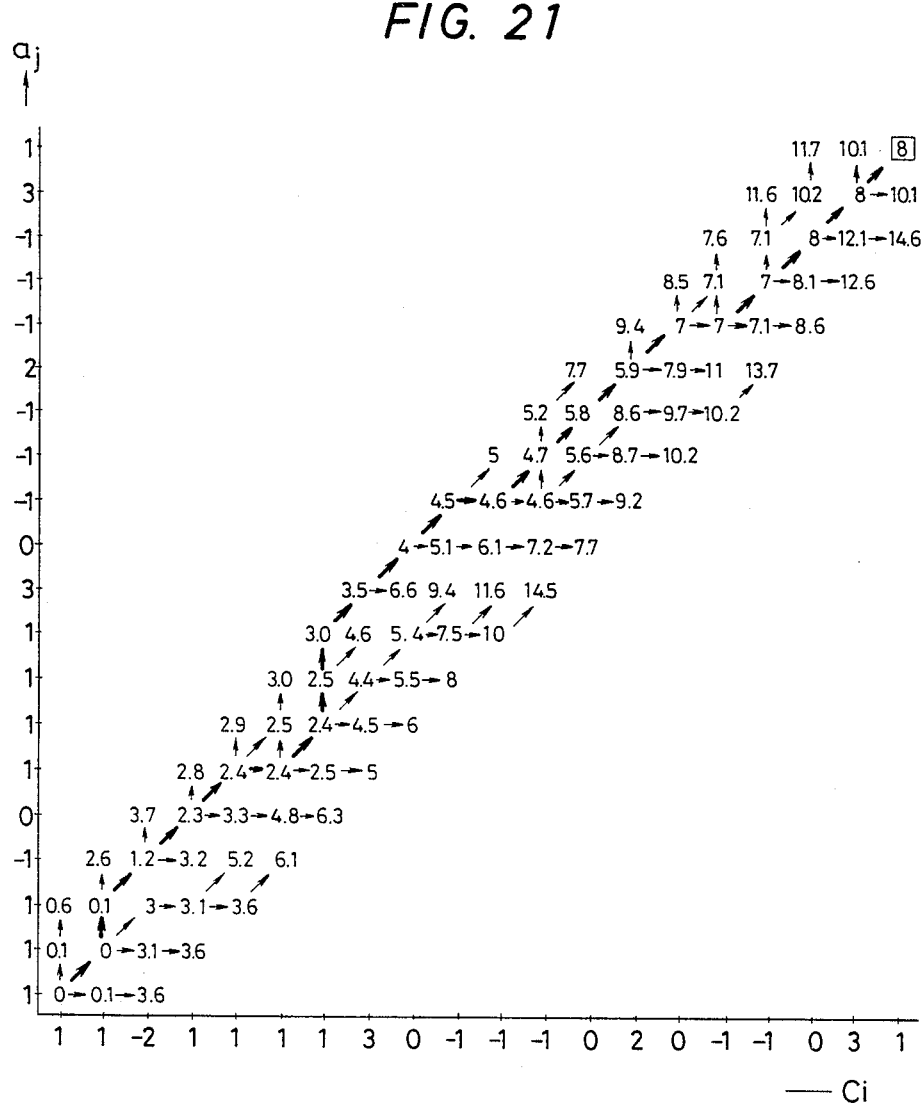
FIG. 21 is a diagram showing a method for calculating the distance D between the code sequence shown in FIG. 19-3 and the code sequence of the reference pattern of character "3"

Next, the case where the distance D (formula (5)) is obtained by the code sequence of the pattern and the reference code of character "3" shown in FIGS. 19-2 and 19-3 mentioned above will be explained. By merely changing the extraction points, further higher accurate recognition can be performed. FIG. 20 is an explanatory diagram in case of deriving the distance D between the reference code sequence $$c_i = 1,1,-2,1,1,1,1,3,0,-1,-1,-1,0,2,0,-1,-1,0,3,1$$

of "3" and the input pattern code sequence $$a_j = 1,0,1,0,0,0,1,1,0,4,0,-2,-1,-1,0,0,-1,-2,0,3$$

of "3". FIG. 21 is an explanatory diagram in case of obtaining the distance D between the above-mentioned reference code sequence $c_i$ and the input pattern code sequence $$a'_j = 1,1,1,-1,0,1,1,1,1,3,0,-1,-1,-1,2,-1,-1,-1,-,3,1$$

of "3" when the extraction points are deviated. The method for calculating the distance D is the same as that described in FIGS. 15 and 16; therefore, its detailed explanation is omitted. Eventually, the distance D becomes from 17.5 (FIG. 20) to 8 (FIG. 21) and the pattern can be more accurately recognized. By observing the marks ↑ in FIGS. 20 and 21, it will be understood that each pixel as shown in FIGS. 22(A) and 22(B) is extracted, respectively.

In addition, there is no need to decide the pattern by means of only this distance, but any other deciding method due to similarity or the like may be used.

Namely, in the above description, a method called dynamic programming (D.P.) is fundamentally used. However, by permitting deviation in position on the code or multi-correspondence, the non-linear matching which can absorb deformation such as, e.g., hand written characters or the like is realized. Further, in the present invention, by adding the positional deviation on the code such as shown in FIG. 12 as an estimation amount (penalty), the improper correspondence (what is called an overmatching) is eliminated while allowing deformation and the accurate and high speed recognition can be realized.

The distance D indicative of similarity of the pattern is calculated for each reference code and the input pattern is decided in accordance with for instance, the following condition.

Practically speaking, assuming that the shortest distance D for a certain input pattern is $D_1$ and the next shorter distance D is $D_2$, if the following conditions of ① and ② are together satisfied, it is determined that the input pattern belongs to the category corresponding to $D_1$. In other cases, it is determined that no corresponding category exists.

① $D_1 < K_1$

② $D_2 - D_1 > K_2$ or the categories corresponding to $D_1$ and $D_2$ are equal.

$K_1$ and $K_2$ are constants which are predetermined depending on a degree of deformation of a pattern to be recognized, mutual confusion of categories, or the like.

The above-mentioned decision result may be directly outputted as a recognition result or it may be stored as a standby category and the processing routine can also advance to further another recognizing process.

In the foregoing embodiment, the method for extracting outline points is not limited to the methods shown in FIGS. 6 and 18. Any method whereby a constant number of pixels such as to represent the characteristics of a shape of a pattern are extracted without being influenced if possible by fine concave and convex portions of the outline shape of the pattern, the noise or the like can be applied without affecting the subsequent processes at all. In addition, the number of coding directions is not limited to eight as shown in FIG. 9. If this direction is more finely (as shown in, e.g., FIG. 23) or roughly divided in accordance with a pattern to be recognized, the invention will be more effective.

Further, in recurrence formula (3) to execute the non-linear matching, by adding a penalty (k) responsive to the multi-correspondence such that $$g(i,j) = d(c_i,a_j) + \min[k \cdot g(i-1,j), k \cdot g(i,j-1-1), g(i-1,j-1)] \quad (6)$$

(where, k is a constant larger than 1) or by changing a penalty for the positional deviation of the code shown in FIG. 12, the restriction condition to deformation is varied, thereby making it possible to carry out the matching suitable for various patterns to be recognized.

It is apparent that the above-described methods may be repeated or combined. L [Hardware constitution]

Figure 24:
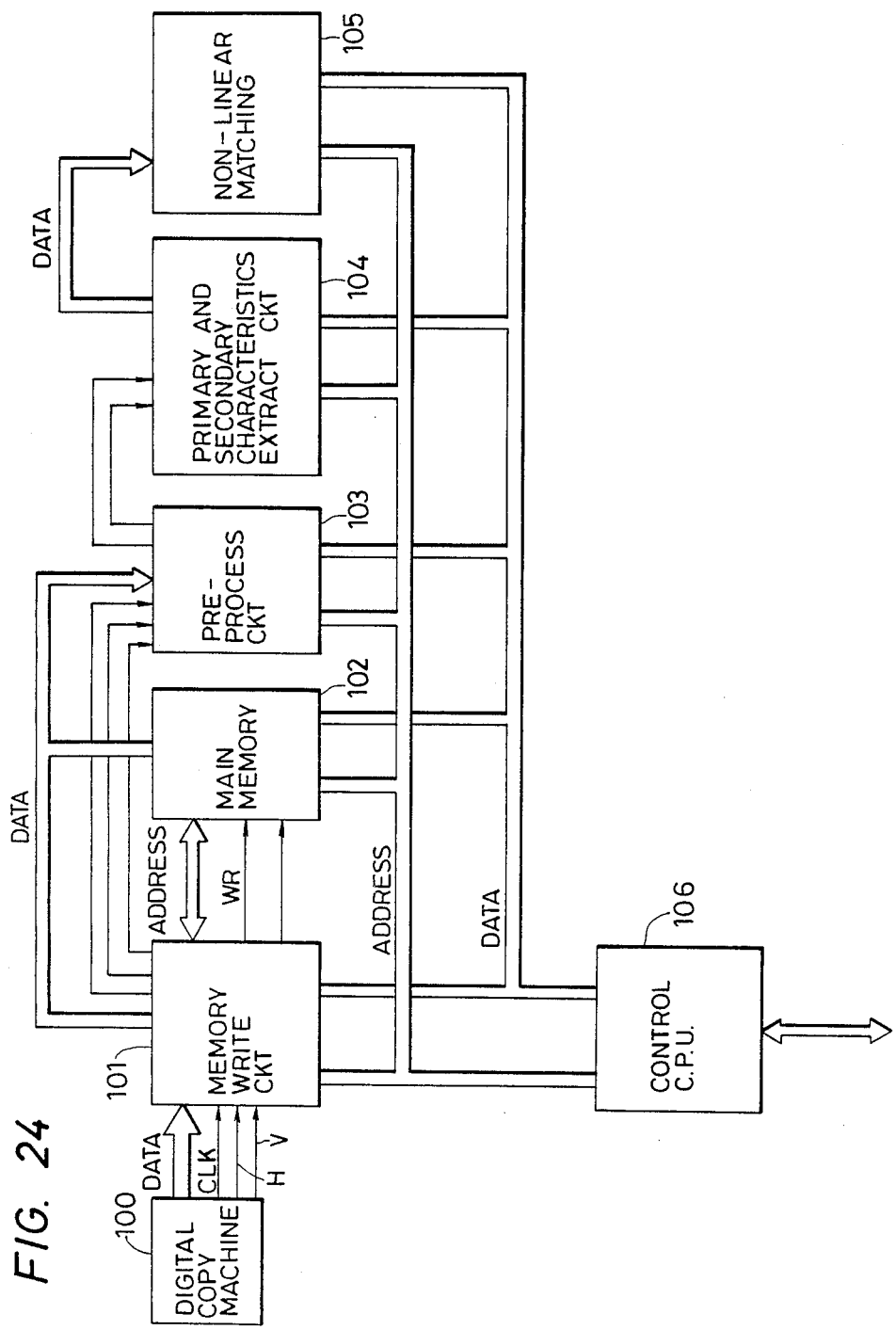
FIG. 24 is a system control block diagram of the invention.

FIG. 24 shows one example of a hardware constitution for performing the method described above. Namely, data in an arbitrary predetermined area in an input original is read by an input apparatus 100 (digital copy reader in the diagram) and is stored in a main memory 102 by a memory writing circuit 101. Next, the data in a character region is digitized and binarized by a pre-processing circuit 103. Further, in primary and secondary characteristics extracting circuit 104, the outline is chased and outline points are extracted and further these extraction points are coded and, as necessary, the secondary characteristics are extracted from the code sequence. A degree of difference between the input pattern and each reference pattern (code) is calculated by a non-linear matching circuit 105. By connecting the above-mentioned respective circuits like a pipeline, a high recognizing speed is derived. On the other hand, a controlling CPU 106 controls the abovementioned respective circuits and performs the control for the primary and secondary characteristics extracting circuit 104 and the controls responsive to the foregoing various kinds of methods for the primary and secondary characteristics extracting circuit 104 on the basis of the control flowcharts shown in FIGS. 6 and 18. Further, the CPU 106 outputs the result of the final recognition to an external apparatus on the basis of a value of the difference derived from the non-linear matching circuit 105 or instructs the primary and secondary characteristics extracting circuit 104 so as to again perform the coding process as necessary.

As described in detail in the above, according to the present invention, a constant number of outline points of a pattern are extracted; the direction differences in the outline tangential directions are derived and coded on the basis of these outline extraction points; the non-linear matching between the above-mentioned code and the reference code which has been preliminarily stored in a memory is performed; the distance indicative of similarity between the input pattern to which an extent of deformation of the pattern was properly incorporated and the category to which the foregoing reference code belongs is calculated; and the input pattern is recognized. Due to this, a high speed and stable recognizing apparatus which is fitted for recognition of various patterns can be realized by a simple constitution.

[Similarity]

Another discriminating method will now be described. In the discriminating section, a correlation between the code sequence derived by the primary characteristic extraction and the reference code sequence which has been preliminarily stored in a memory is first obtained and a similarity S between the input pattern and the category to which the reference code sequence belongs is calculated. The calculating equation is shown below.

Assuming that the code sequence of a certain input pattern is $$a_1, a_2, \ldots, a_N$$

and the reference code sequence is $$c_1, c_2, \ldots, c_N, \qquad (5\text{-}1)$$

$$S = \frac{\sum_{i=1}^{N} a_i \cdot c_i}{\left(\sum_{i=1}^{N} a_i^2 \cdot \sum_{i=1}^{N} c_i^2\right)^{\frac{1}{2}}}$$

where, a value of S lies within a range of $-1 < S < 1$ and becomes large as the similarity is high.

For example, the similarities among the foregoing reference codes (shown in FIG. 25) representative of character patterns "2" and "3" and the input pattern shown in FIG. 11 are respectively 0.95 and 0.39. It is obvious that the similarity for "2" is larger than that for "3".

The similarity S for each reference code is calculated and the input pattern is decided in accordance with, e.g., the following condition.

Namely, when it is assumed that the largest one of the similarities for each reference code of a certain input pattern is $S_1$ and the next large similarity is $S_2$, if both of the following conditions ① and ② are satisfied, it is determined that the input pattern belongs to the category corresponding to the $S_1$. In other cases, it is determined that no corresponding category exists.

① $S_1 > K_1$
② $S_1 - S_2 > K_2$ or the categories corresponding to the $S_1$ and $S_2$ are equal.

$K_1$ and $K_2$ are constants which are predetermined due to a degree of deformation of a pattern to be recognized, confusion of mutual categories, or the like.

In addition, the above-mentioned discrimination result may be directly outputted as a recognition result. Or, it may be stored as a standby category and the processing routine can also advance to further another recognizing process.

In the foregoing embodiment, the method for extracting outline points is not limited to the method shown in FIG. 6. Any method whereby a constant number of pixels such as to represent the characteristics of a shape of a pattern are extracted if possible without being influenced by fine concave and convex portions of the outline shape of the pattern, the noise or the like can be applied without affecting the subsequent processes at all.

Further, there is also another method whereby the positional deviation f the code is absorbed and the stable recognition can be performed for larger deformation of the pattern or fine noise by modifying equation (5-1) regarding similarity to $$S' = \frac{\sum_{i=1}^{N} c(a_i + \delta a_{i-1} + \delta a_{i+1})}{\left(\sum_{i=1}^{N} a_i^2 \cdot \sum_{i=1}^{N} c_i^2\right)^{\frac{1}{2}}} \qquad (5\text{-}2)$$

(where $\delta$ is a constant within a range of $0 \leq \delta \leq 1$). However, there is also a case where separation of the pattern could be lost if a value of $\delta$ is too large. Therefore, it will be effective if a value of $\delta$ is determined depending on the feature of the pattern to be recognized.

It is apparent that the above-described methods may be repeated or combined.

However, there are cases where it is determined that there is no category which belongs to an input pattern or there are two or more categories which belong to an input pattern in dependence upon the input pattern. In such cases, the extracting operation is again performed to extract other outline points and thereafter similar processes are carried out, thereby making it possible to accurately decide the category to which the input pattern belongs.

In addition, the discrimination result due to the foregoing series of processes may be directly outputted as a recognition result or it may be stored as a standby category and to the processing routine can be also advance further to another recognizing process.

Moreover, the method for calculating similarity and its discriminating method are not limited to equations (5-1) and (5-2) in the foregoing embodiment.

On the other hand, in the foregoing embodiment, the characteristic extraction and discrimination are performed by use of only one of a set of outline extraction points (a group of extraction points which are derived due to a single outline extraction) at a time. However, there is also another method whereby a plurality of sets of outline extraction points are simultaneously used. For instance, assuming that K is a certain natural number, a set of outline extraction points when $$\delta = 0, \frac{1}{K}, \frac{2}{K}, \ldots, \frac{K-1}{K} \qquad (7)$$

are obtained. Assuming that the similarities for a certain category which are obtained on the basis of the respective outline extraction points are $$S_1, S_2, S_3, \ldots, S_K,$$

the similarity S between the input pattern and its category can be calculated, for instance, by way of the following equation (8) or (9).

$$S = \min [S_1, S_2, \ldots S_K] \qquad (8)$$

$$S = \frac{\sum_{i=1}^{K} S_i}{K} \qquad (9)$$

Either one of the above two equations should be selected in dependence on the property of a pattern to be recognized. Due to these methods, the more accurate recognition can be performed.

It is apparent that the above-described methods may be repeated or combined.

As described in detail in the above, according to the present invention, in the pattern recognizing apparatus in which a constant number of outline points of a pattern are extracted and the direction differences in the outline-tangential directions are derived and coded on the basis of these outline points and the input pattern is identified using the code, it is possible to provide the pattern recognizing apparatus which performs the recognition step by step or simultaneously as necessary a plurality of different sets of extraction points as sets of extraction points each consisting of the above-mentioned constant number of extraction points and thereby performing the accurate recognition by a simple constitution.

Further, a constant number of outline points of a pattern are extracted; the direction differences in the outline tangential directions are derived and coded on the basis of the outline points; a correlation between the foregoing code and the reference code which has preliminarily been stored in a memory is obtained; a similarity between the input pattern and the category to which the reference code belongs is calculated; and the input pattern is recognized. Due to this, it is possible to provide the high speed pattern recognizing apparatus of a high recognition factor by a simple constitution.

FIG. 11 shows the result in which the extraction of outline points and direction coding process described in detail in the above example were performed for the pattern shown in FIG. 7. Each numeric value indicated by ( ) in the diagram denotes the code sequence. It will be understood that the outline shape is well expressed without being influenced by fine concave and convex portions of the pattern and also its length is normalized.

[Characteristic parameters]

Next, in the secondary characteristic extraction, by use of the code sequence derived due to the primary characteristic extraction for the pattern shown in FIG. 11, the information which is particularly useful for the subsequent discrimination is extracted as characteristic parameters from the code sequence. Examples of these characteristic parameters are shown below.

$P_1$: Number of codes "4"
$P_2$: Number of codes "3"
$P_3$: Number of codes "2"
$P_4$: Number of codes "1"
$P_5$: Number of codes "0"
$P_6$: Number of codes "−1"
$P_7$: Number of codes "−2"
$P_8$: Number or codes "−3"
$P_9$: Number of blocks of minus codes. Code "0" may exist between minus codes.
$P_{10}$: Number of blocks of codes of "−2" or less
$P_{11}$: Number of blocks of codes of "2" or more
$P_{12}$: Number of blocks of codes of "3" or more
$P_{13}$: Maximum number of successive codes "0"
$P_{14}$: Total number of minus codes In the above-mentioned parameters, for instance, $P_0$ is equal to the number of loops or the number of patterns separated and $P_9$ is equal to the number of concave portions of the pattern, in which both parameters $P_0$ and $P_9$ indicate the principal features of the pattern. $P_5$ and $P_{13}$ represent the linearity of the outline shape of the pattern. $P_{11}$ corresponds to the number of pointed portions.

[Dictionaries]

Figures 23, 25, 26:
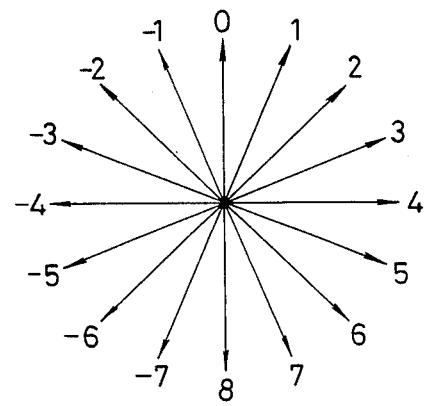
FIG. 23 is a diagram showing direction codes which were finely divided.
FIG. 25 is a diagram showing the reference codes of the character patterns "2" and "3"
FIG. 26 is a diagram showing one example of a dictionary for every category.

Next, on the basis of the data derived in the above examples, values of the characteristic parameters which are obtained due to the secondary characteristic extraction are collated with the dictionaries for every category which have been preliminarily stored in a memory, thereby discriminating to which category the input pattern belongs or if it belongs to no category. FIG. 26 shows an example of the dictionaries. In the diagram, MAX and MIN denote the permissible maximum and minimum values of each characteristic parameter and a mark X indicates that there is no limitation. If all characteristic parameters $P_1$ to $P_{14}$ satisfy the conditions, it is determined that the input pattern belongs to its category.

The discrimination result may be directly outputted as a recognition result or it may be stored as a standby category and the processing routine can also advance to further another recognizing process.

Further, the characteristic parameters are not limited to $P_0$ to $P_{14}$ shown here. Other various kinds of parameters may be used in accordance with a pattern to be recognized.

[Distance for each category]

The discriminating method is not limited to the method of collation with the dictionary such as shown in FIG. 26. There is also another method whereby the distance D between the input pattern and each category is calculated as each function of characteristic parameters $P_0$ to $P_k$ and a discrimination is made on the basis of a magnitude of D.

For instance, $$D = \sum_{i=0}^{k} a_i (b_i - P_i)^2 \qquad (10)$$

where, $a_i$ and $b_i$ are constants which are determined for every category.

As described in detail in the above, according to the present invention, a constant number of outline points of a pattern are extracted; the direction differences in the outline tangential directions are derived and coded on the basis of those outline points; further the characteristic parameters are obtained therefrom; and thereby enabling the characteristics of the pattern shape to be stably represented with high fidelity by use of a little information. Thus, it is possible to provide a high speed pattern recognizing apparatus of high recognition factor as a whole by combining with a simple discriminating method.

In addition, a predetermined number of outline points can be extracted by a simple algorithm and an accuracy in the subsequent pattern recognition can be raised.

[Digital straight line]

Returning to FIG. 7, a method whereby m outline points are selected and extracted as uniformly as possible from all of n outline points arranged of such a pattern as shown in FIG. 7 mentioned before will then be explained. In this method, the well known concept of a digital straight line is applied. This concept will be shown below Generally, it is considered to extract m of the n outline points arranged as uniformily as possible. In this case, even if m/n is an irreducible fraction, its generality is not lost.

First, m/n is decomposed to a continued fraction as shown below.

$$\frac{m}{n} = \cfrac{1}{P_1 - \cfrac{1}{P_2 - \cfrac{1}{\phantom{xx} \ddots \phantom{xx} P_{N-1} - \cfrac{1}{P_N}}}}$$

This fraction is described such that $$m/n = \{P_1, P_2, \ldots, P_N\}$$

A symbol string of 1 and 0 is obtained in compliance with two rules shown below.

(i) The symbol string for $\{P_N\}$ is $_0P_N-1\ _1$. For example, if $N=3$, $0^{P_3}-1 1$. If $P_3-1$ is e.g., 2, we will have $0_2 1 \to 001$.

(ii) The rewriting from $\{P_i, P_{i+1}, \ldots, P_N\}$ to $\{P_i, P_{i+1}, \ldots P_N\}$ to which $P_i$ was added is $$0 \to 0^{P_i-1} 1, \quad 1 \to 0^{P_i-2} 1$$

For example, when $n=18$ and $m=5$, $$\frac{5}{18} = \cfrac{1}{4 - \cfrac{1}{3 - \cfrac{1}{2}}} = \{P_1, P_2, P_3\} = \{4,3,2\}$$

With respect to $\{2\}$, $0^{P_3}-1 1$ becomes $0^1 1 \to 01$ since $P_3 = 2$ for $\{P_N\}$ (in this case, $N=3$) from (i).

Next, when $P_2 = 3$, from (ii), we have $$0 \to 0^{P_2-1}1 = 0^2 1 \to 001$$

$$1 \to 0^{P_2-2}1 = 0^1 1 \to 0\ 1$$

Similarly, with regard to $\{4, 3, 2\}$ including $P_1 = 4$, we have $$0 \to 0^{P_i-1}1 = 0^3 1 \to 0001 \quad (12)$$

$$1 \to 0^{P_i-2}1 = 0^2 1 \to 001$$

-continued $$\{2\} \quad\quad 0 \quad\quad 1$$
$$\{3,2\} \quad \overbrace{0 \quad 0 \quad 1} \quad \overbrace{0 \quad 1}$$
$$\{4,3,2\} \quad \overbrace{0001} \overbrace{0001} \overbrace{001} \quad \overbrace{0001} \overbrace{001}$$

As is obvious, the outline points corresponding to the position of 1 of the symbol string shown in equation (12) may be selected.

The case where the foregoing method is applied to the original pattern of "2" shown in FIG. 7 mentioned before will now be considered. First, assuming that the number of all outline points is 83, we will have $$\frac{20}{83} = \{5,2,2,2,2,2,3,2\} \quad (13)$$

since $$\frac{20}{83} = \cfrac{1}{5 - \cfrac{1}{2 - \cfrac{1}{2 - \cfrac{1}{2 - \cfrac{1}{2 - \cfrac{1}{2 - \cfrac{1}{3 - \cfrac{1}{2}}}}}}}}$$

Therefore, with reference to the foregoing items (i) and (ii), the following symbol string is derived.

$$00001000100010001000100010001000100010001$$
$$0001000100010000100010001000100010001 \quad (14)$$

Figure 27:
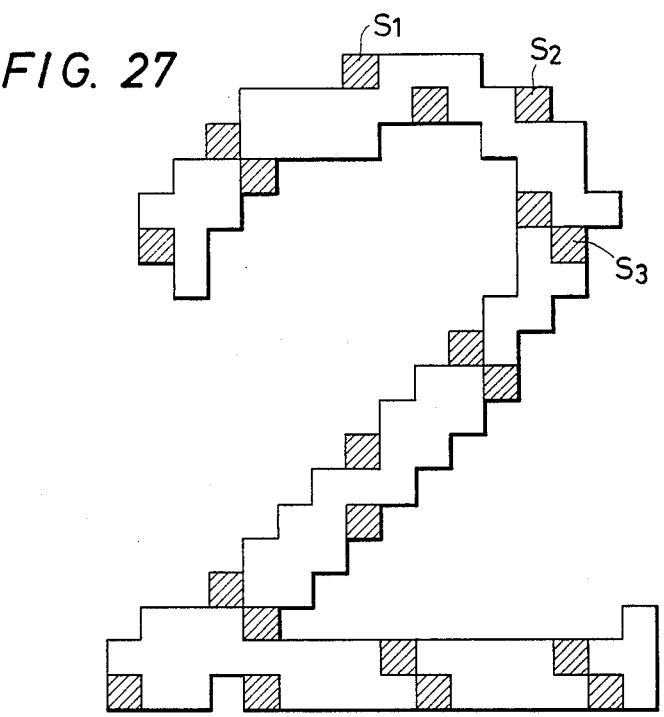
FIGS. 27 and 28 are diagrams showing the extraction points for a pattern.
Figure 28:
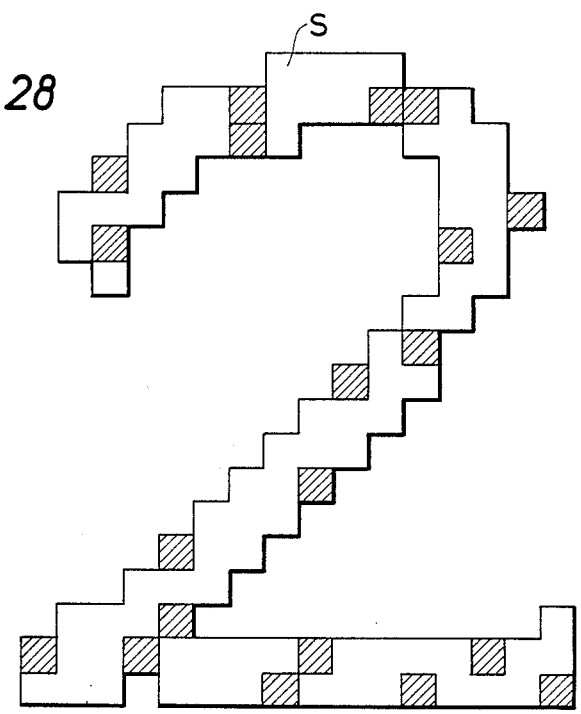

If each outline point when the outline is chased clockwise from the point S in the diagram as a start point and the outline points corresponding to 1 of the symbol string when the symbol string of expression (14) is made of corresponding points are extracted, the extraction points (hatched portions in the diagrams) shown in FIGS. 27 and 28 are derived.

Next, the code sequence representative of the outline information is derived from the outline extraction points thus obtained in a manner as follows.

Namely, the direction of the line segment connecting the adjacent outline extraction points is obtained while chasing the outline extraction points in a predetermined direction of the outline. Further, the direction difference between this direction and the direction obtained one sampling before is digitized, for example, in accordance with the codes shown in FIG. 9 and then these digitized directions are sequentially coded. FIG. 9 is applied to the case where the outline is chased clockwise and code 0 indicates the case where the above-mentioned direction coincides with the direction obtained one sampling before. It is obvious that the chasing direction and coding method are not limited to them.

FIG. 11 shows the direction codes obtained on the basis of the outline extraction points derived on the basis of FIG. 27. Namely, the following code sequence is obtained.

$$1,1,1,0,0,-3,0,1,3,0,0,3,0,0,0,-2,-2,0,4,1 \quad (15)$$

As will be apparent from this diagram, the code sequence thus derived is stable without being influenced by fine concave and convex portions of the outline and its length is normalized.

Further, since the coding process is performed in accordance with FIG. 9, the code sequence of expression (15) is successive and periodic. This point is very advantageous for the subsequent processes and is important for reduction of the processes required for the overall pattern recognition and for improvement in recognition factor.

On the other hand, the pattern can be identified by calculating similarity between this pattern and the reference pattern for every category which has been preliminarily stored by use of the foregoing code sequence. In addition, the input pattern can be also decided by further extracting and using the secondary characteristics (for instance, the numbers of straight advances, right turns, left turns, quick right turns, quick left turns, etc.) from the above-mentioned code sequence. This situation is shown in FIG. 10 with respect to the pattern in FIG. 2. In FIG. 10, "Quick-Right 2", "Straight 1", and the like correspond to those in FIG. 2.

In the foregoing embodiment, the length l of outline in STEP 12 in FIG. 6 was determined in accordance with equations (1) and (1'). However, equation (1') may be modified to $$l = l + \sqrt{2}$$

to more accurately determine the distance or may be modified to $$l = l + 1$$

to reduce the calculation time.

As described above, according to the present invention, by extracting a predetermined number of outline points from among the respective outline points forming the outline of the pattern, the smoothing and normalization are simultaneously performed, thereby making it possible to always derive the stable code sequence of an equal length.

Further, by executing the coding process according to the present invention, the successive and periodic code sequence can be obtained in addition to the above-mentioned advantage. Consequently, the processing steps required for the overall pattern recognition can be reduced and the recognition factor can be improved.

[Method for extracting characteristic points and periodic function]

Figure 29A:
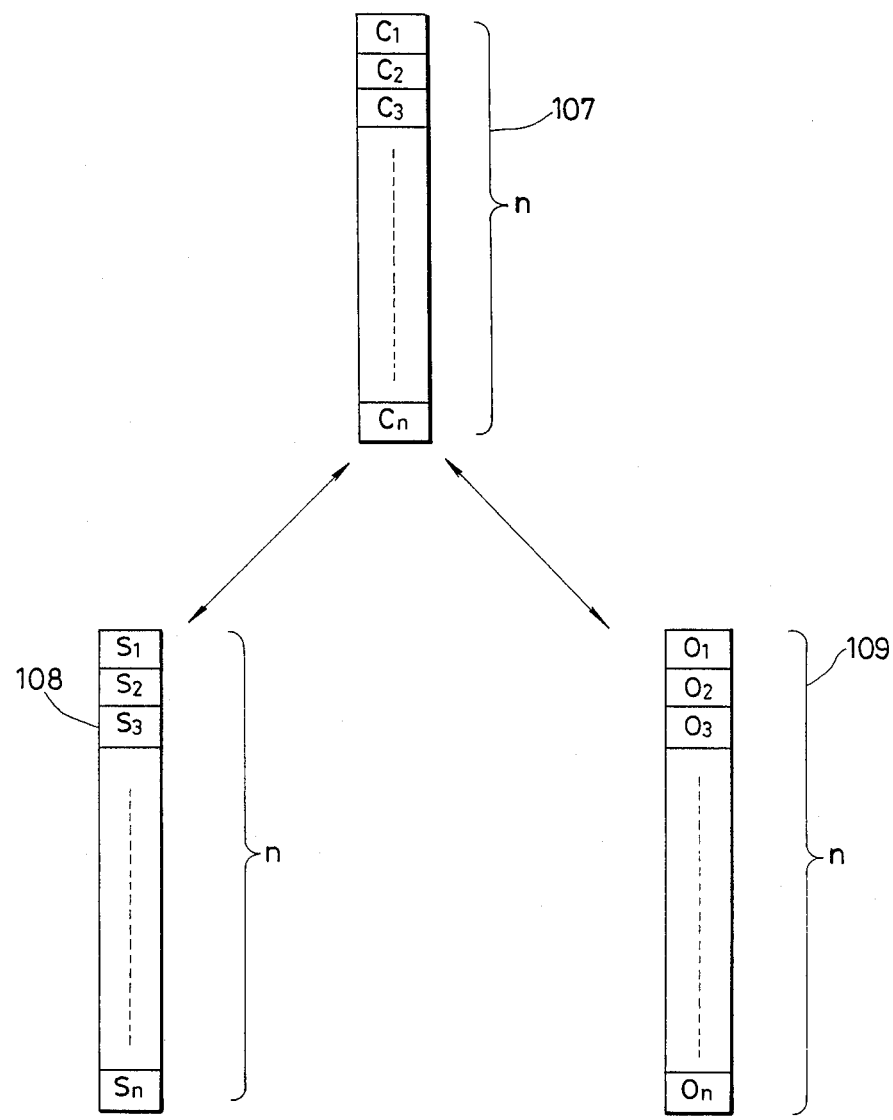
FIG. 29(A) is a diagram showing an example of a method for extracting characteristic points.
Figure 29B:
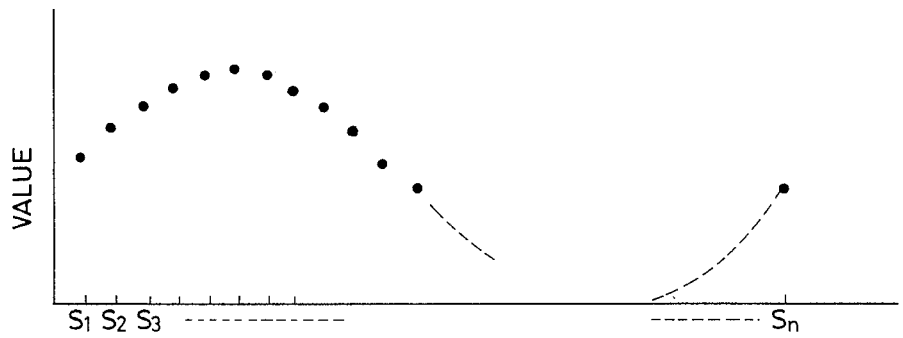

FIG. 29(A) shows an embodiment of the foregoing method for extracting characteristic points. In the diagram, a reference numeral 107 denotes a memory in which the direction difference code sequence has been stored and corresponds to a part of the memory 18 in FIG. 5-1. The same shall apply to the description of the direction difference code sequence mentioned before. It is assumed that a length of code sequence is normalized to a constant value of n. Numerals 108 and 109 are memories in which peculiar numeric values have been stored to calculate the characteristic points and correspond to a part of the memory 18 in FIG. 5-1. For example, the numeric values corresponding to one period of a sine wave have been dispersed and stored in the memory 108 as shown in FIG. 29(B) and it is assumed that the total number of these numeric values is n similarly to the length of code sequence. On one hand, the numeric values having the phase difference of 90° as compared with that in the memory 108 have been stored in the memory 109. Assuming that the storage content of the memory 108 corresponds to a sine curve, the numeric values responsive to a COS curve have been stored in the memory 109. The following operation is performed for the code data of the pattern to be detected and two reference data stored in the memories 107 to 109.

$$F = \left\{ \left( \sum_{K=1}^{n} C_K S_K \right)^2 + \left( \sum_{K=1}^{n} C_K O_K \right)^2 \right\} / \left( \sum_{K=1}^{n} C_K \right)^2$$

Namely, the sine wave component for the code sequence of the pattern to be detected is calculated and this component is set to a characteristic amount F of the pattern. Since the code sequence is a repetitive function and has a successive form, the characteristic amount of the pattern can be directly obtained as a form of Fourier transformation. This characteristic amount F corresponds to until which extent of component in the sine wave pattern of the reference data the interval which is caused in the case where the length of code data sequence is normalized to the length n contributes to at a turning point in the boundary portion of the pattern to be detected.

The discriminating section compares the characteristic amount from the characteristic point extracting section with the dictionary data stored in the discriminating section and determines the pattern.

As described above, according to the invention, a correlation between the data of the direction code difference of the boundary line and the pattern data of a constant shape is calculated and a value of this correlation is used as a characteristic amount of the pattern. In other words, as compared with the work to get a correlation value for all pattern data as in the conventional manner, the number of pattern data of a constant shape is fairly small, so that a high speed pattern recognition can be realized.

Figure 30:
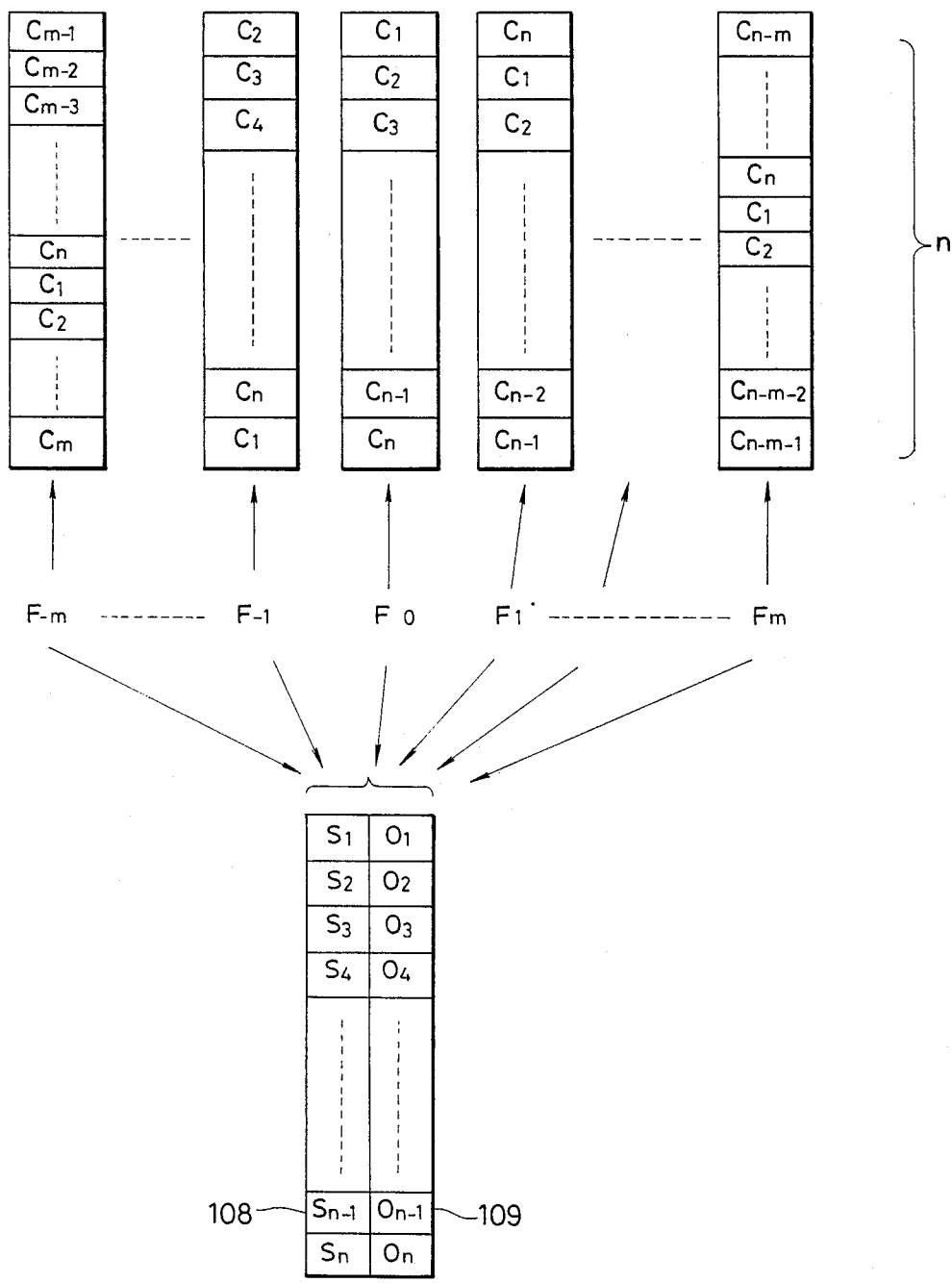
FIG. 30 is an explanatory diagram in the case where the shifting is performed a plurality of times for the direction code data and the correlation values are calculated.

In the embodiment of the invention mentioned above, the length of direction code data is set to a constant value n and a correlation of n constant pattern detection data is got and thereby the characteristic amount is calculated. FIG. 30 shows the case where the direction code data is shifted as many as a plurality of times in the case of getting a correlation and the maximum value of the correlation values or the mean value thereof is used as a characteristic amount. A reference character $F_m$ denotes a characteristic amount which is derived in each shifting operation and the maximum value of $F_m$ is set to a characteristic amount of this pattern.

Figure 29C:
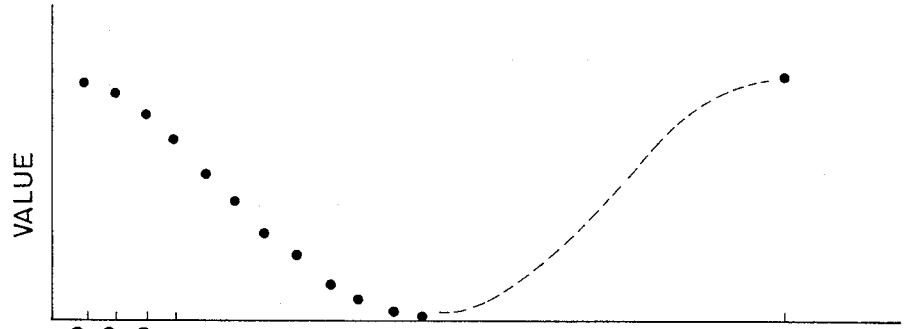
Figure 31:
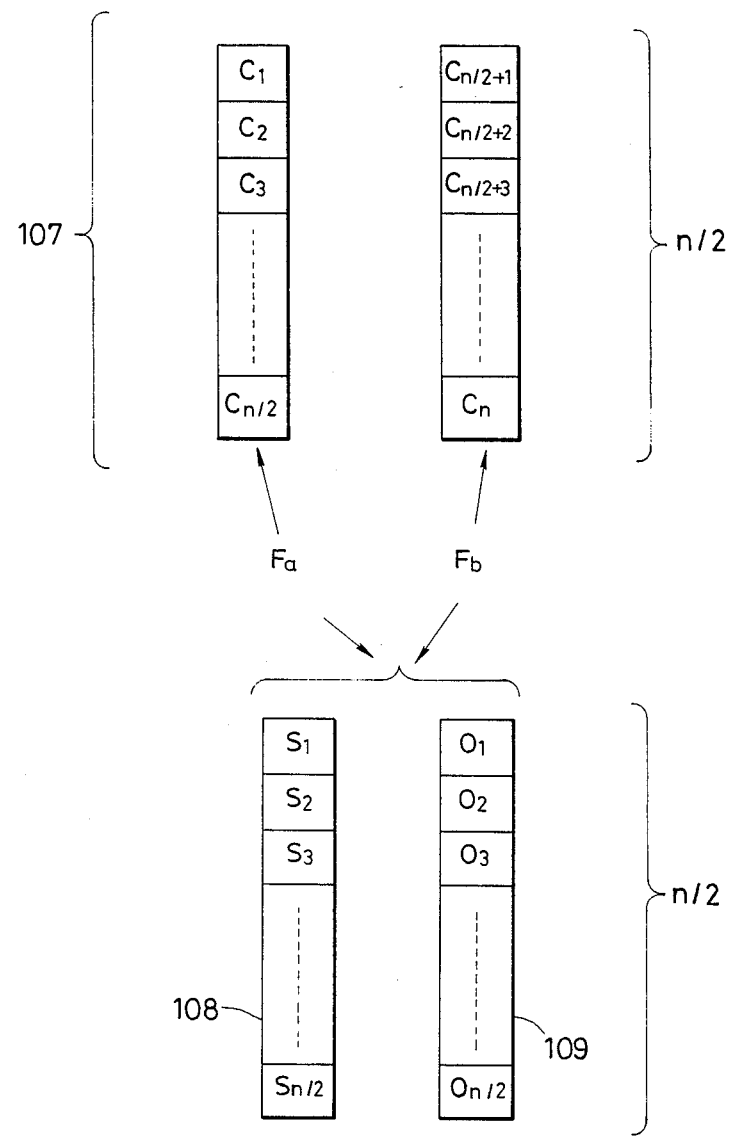
FIG. 31 is a diagram showing the case where a code pattern to be detected is divided into a plurality of codes and a correlation between each code sequence and constant pattern detection data is got in a similar manner as above.

FIG. 31 shows the case where a code pattern to be detected is divided into a plurality of parts and a correlation between each code sequence and a constant pattern detection data is got in a similar manner as above. In FIG. 31, the embodiment in the case where the code data sequence is divided into two parts, in which it is assumed that n/2 fixed data as much as one period having the phase difference of 90° have been stored in the pattern detection data similarly to the embodiment of FIG. 29. Namely, in FIG. 31, a degree of contribution $F_a$ to the pattern detection data at a turning point of the former half in the code sequence of the pattern to be detected and a degree of contribution Fb of the latter half are calculated, thereby constituting characteristic points of the pattern.

Figure 32:
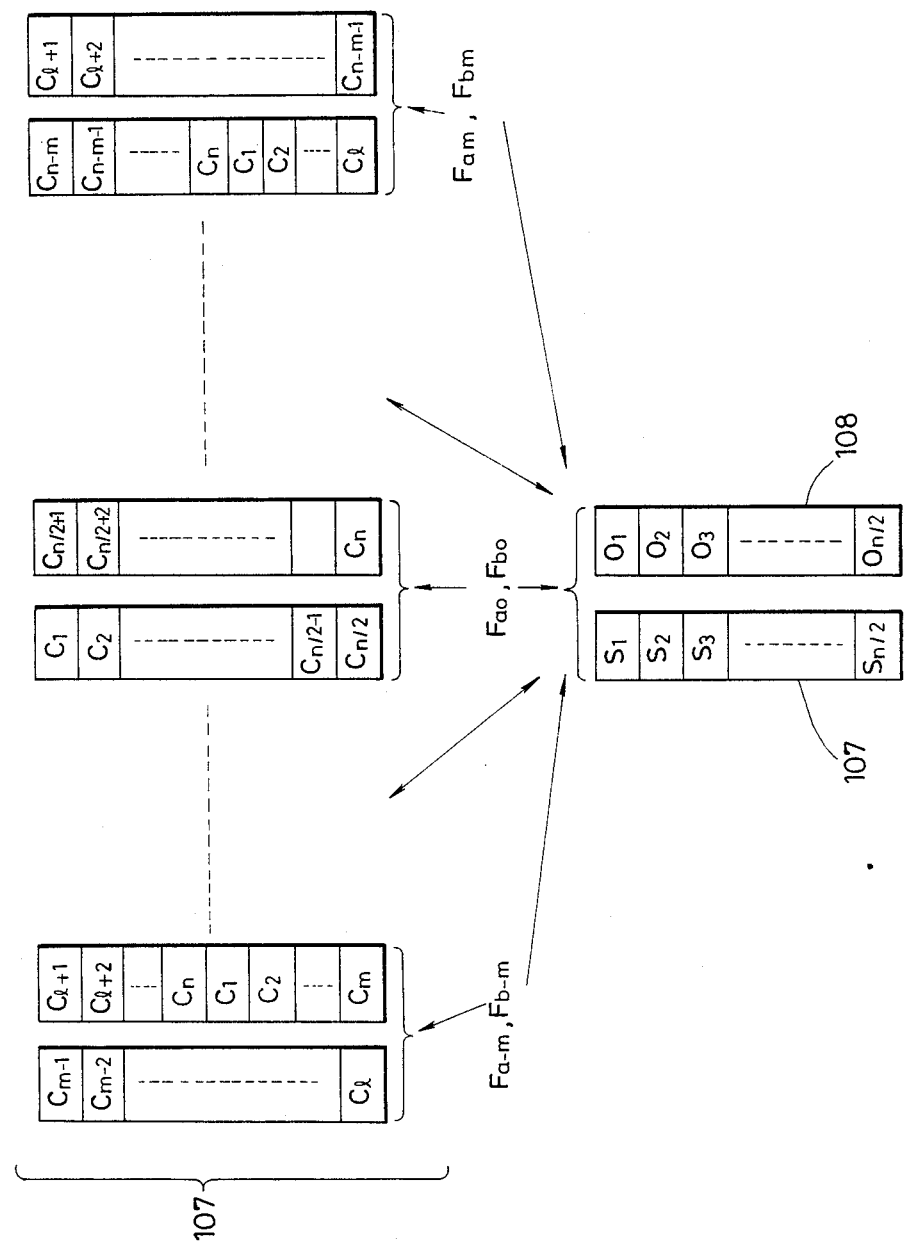
FIG. 32 is an explanatory diagram in the case where the correlation values are further accurately calculated similarly to FIG. 30.

FIG. 32 shows an embodiment in the case where the divided code sequence 107 in this embodiment is shifted similarly to FIG. 30 and correlations among them and the pattern detection data are got and then the maximum value of these correlation or the mean value thereof is set to a characteristic point. Namely, in the case where the turning point exists near the dividing point, in the embodiment of FIG. 31, it is possible to consider the case where the turning point is divided into the former half or the latter half of the code sequence, so that the high precise characteristic point cannot be calculated. However, in the method shown in FIG. 32, this case does not occur.

As described above, according to the present invention, in recognition of a pattern, the direction difference code sequence of the pattern boundary line is detected and correlations among this code sequence and two pattern data of a constant shape in which there is a difference of 90° between their phases are got and the correlation values are set to characteristic points of the pattern, thereby reducing an amount of storage in the dictionary to determine the pattern from the code sequence. Thus, the total number of dictionary code data which is referred to is reduced and a high speed pattern recognition and simplification of the system can be realized.

What is claimed is:

1. An image processing method comprising the steps of:
   detecting a plurality of outline points of an image pattern;
   calculating the number of said outline points;
   extracting a predetermined number of outline points substantially equally distributed among said outline points; and
   obtaining the difference in outline tangential direction between each adjacent two of said extracted outline points and calculating a relative code sequence therefrom.

2. An image processing method according to claim 1, further comprising a step of performing a non-linear matching between said calculated relative code sequence and a reference relative code in a dictionary means, wherein said predetermined number is the same as the number of outline points of an image pattern which is represented by said reference code stored in said dictionary means.

3. An image processing method according to claim 1, further comprising the step of:
   assuming that
   said code sequence of said image pattern is
   $a_1, a_2, \ldots, a_N$
   and said reference code sequence is
   $c_1, c_2, \ldots, c_N$,
   in said obtaining step, calculating $$S = \frac{\sum_{i=1}^{N} a_i \cdot c_i}{\left(\sum_{i=1}^{N} a_i^2 \cdot \sum_{i=1}^{N} c_i^2\right)^{\frac{1}{2}}}$$

thereby performing discrimination of the non-linear matching.

4. An image processing apparatus according to claim 1, wherein said detecting step includes a step of selecting a desired pattern from among an image read by a digital copier.

5. An image processing apparatus comprising:
   detecting means for detecting a plurality of outline points of an image pattern;
   calculating means for calculating the number of said outline points;
   extracting means for extracting a predetermined number of outline points substantially equally distributed among said outline points;
   means for obtaining the difference in outline tangential direction between each adjacent two of said points extracted by said extracting means and calculating therefrom a code sequence;
   a dictionary for storing reference code sequences; and
   means for performing a non-linear matching between said calculated code sequence and a reference code sequence stored in said dictionary.

6. An image processing apparatus according to claim 5, wherein said detecting means includes pre-processing means for selecting a desired pattern from among an image read by a digital copier.

7. An image processing apparatus according to claim 5, wherein, assuming that
   said code sequence of said input pattern
   $a_1, a_2, \ldots, a_n$
   and a reference code sequence is
   $c_1, c_2, \ldots, c_n$,
   said performing means performs the matching of the pattern on the basis of following equations $$g(1, 1) = d(c_1, a_1)$$

$$g(i, j) = d(c_i, a_j) + \min[g(i-1, j), g(i, j-1), g(i-1, j-1)]$$

where,
   $d(c_i, a_j) = |c_i - a_j| + f(|c_i - a_j|)$ and
   $d(c_i, a_j)$ is a distance and $f(c_i - a_j)$ is a penalty for a deviation of the code sequence.

8. An image processing apparatus according to claim 5, wherein said predetermined number is the same as the number of outline points of an image patten which is represented by said reference code sequence stored in said dictionary.

9. An image processing apparatus comprising:
   input means for inputting a desired area of an image pattern of an input original to be recognized;
   memory means for storing image pattern information input by said input means;
   pre-processing means for selecting a character area from said desired image pattern area stored in said memory means;
   dictionary means for storing a reference doe sequence representing a reference pattern;
   first calculating means for calculating the number of a plurality of outline points of said image pattern to be recognized in response to the output from said pre-processing means;
   extracting means for extracting a predetermined number of the outline points from among said plurality of said outline points;
   second calculating means for obtaining the difference in outline tangential direction between each adjacent two of said outline points extracted by said extracting means in order to calculate a pattern code sequence;
   matching means for performing a non-linear matching between said pattern code sequence calculated by said second calculating means and said reference code sequence in said dictionary means;
connecting means for connecting at least three of said means set forth above in the form of pipeline; and
control means connected with said connecting means, for indicating a restart of operations which are performed by said first calculating means, said extracting means, said second calculating means, said matching means, and said connecting means in response to an operation result on said matching means.

10. An image processing apparatus according to claim 9, wherein said predetermined number is the same as the number of outline points of an image pattern which is represented by said reference code sequence stored in said dictionary.

11. An image processing apparatus according to claim 9, wherein, assuming that
said pattern code sequence of said image pattern
$a_1, a_2, \ldots, a_N$
and said reference code sequence is
$c_1, c_2, \ldots, c_N$, said matching means calculates $$S = \frac{\sum_{i=1}^{N} a_i \cdot c_i}{\left( \sum_{i=1}^{N} a_i^2 \cdot \sum_{i=1}^{N} c_i^2 \right)^{\frac{1}{2}}}$$

and thereby performs discrimination of the matching.

* * * * *

UNITED STATES PATENT AND TRADEMARK OFFICE
CERTIFICATE OF CORRECTION

PATENT NO. : 4,833,721   Page 1 of 4
DATED : May 23, 1989
INVENTOR(S) : Okutomi, et al.

It is certified that error appears in the above-identified patent and that said Letters Patent is hereby corrected as shown below:

COLUMN 1:

Line 11, "other any" should read --any other--.

COLUMN 3:

Line 50, "input" should read --input pattern;--.

COLUMN 5:

Line 55, "(STEPs 1 and 12)." should read --(STEPs 11 and 12).--

COLUMN 6:

Line 24, " hatched" should be flush with left margin.

COLUMN 8:

Line 18, "of "3" t" should read --of "3"--.

UNITED STATES PATENT AND TRADEMARK OFFICE
CERTIFICATE OF CORRECTION

PATENT NO. : 4,833,721
DATED : May 23, 1989
INVENTOR(S) : Okutomi, et al.

It is certified that error appears in the above-identified patent and that said Letters Patent is hereby corrected as shown below:

COLUMN 10:

Line 44, "k-g(i,j-1-1),g(i-1,j-1)]" should read --k·g(i,j-1),g(i-1,j-1)]--.

Line 53, "L [Hardware constitution]" should read --[Hardware constitution]--.

COLUMN 11:

Line 56, "of - 1<S<1 and" should read --of $-1 \leq S \leq 1$ and--.

COLUMN 12:

Line 27, "deviation f" should read --deviation of--.

COLUMN 15:

Line 22, "below" should read --below.--.

UNITED STATES PATENT AND TRADEMARK OFFICE
CERTIFICATE OF CORRECTION

PATENT NO. : 4,833,721

DATED : May 23, 1989

INVENTOR(S) : Okutomi, et al.

It is certified that error appears in the above-identified patent and that said Letters Patent is hereby corrected as shown below:

Line 30,
$$"\frac{m}{n} = \frac{1}{P_1 - \frac{1}{P_2 - \frac{\cdots}{P_{N-1} - \frac{1}{P_2}}}}"$$
should read $$--\frac{m}{n} = \frac{1}{P_1 - \frac{1}{P_2 - \frac{1}{P_{N-1} - \frac{1}{P_N}}}}--$$

Line 44, change "$\{P_i, P_{i+1}, \ldots, P_N\}$ to --$\{(P_{i+1}, \ldots, P_N)\}$ to--.

COLUMN 16:

Line 32, "0000100010001000100100010000100010000410001" should read
--00001000100010001000100010000100010001000--.

COLUMN 17:
Line 32, "1=1+1" should read --$\ell = \ell+1$--.

UNITED STATES PATENT AND TRADEMARK OFFICE
CERTIFICATE OF CORRECTION

PATENT NO. : 4,833,721
DATED : May 23, 1989
INVENTOR(S) : Okutomi, et al.

It is certified that error appears in the above-identified patent and that said Letters Patent is hereby corrected as shown below:

COLUMN 19:

Line 63, "thereby" should read --and thereby--.

COLUMN 20:

Line 24, "pattern" should read --pattern is--.

Line 33, "g(i-1,j-1)" should read --g(i-1,j-1)]--.

Line 52, "doe" should read --code--.

COLUMN 21:
Line 5, "means" should read --means,--.

COLUMN 22:

Line 5, "pattern" should read --pattern is--.

Signed and Sealed this

Thirty-first Day of December, 1991

Attest:

HARRY F. MANBECK, JR.

Attesting Officer     Commissioner of Patents and Trademarks